US009488244B2

United States Patent
Mizuno

(10) Patent No.: US 9,488,244 B2
(45) Date of Patent: Nov. 8, 2016

(54) SHOCK ABSORBER

(71) Applicant: TOYOTA JIDOSHA KABUSHIKI KAISHA, Toyota-shi, Aichi (JP)

(72) Inventor: Kazuyuki Mizuno, Susono (JP)

(73) Assignee: TOYOTA JIDOSHA KABUSHIKI KAISHA, Aichi-ken (JP)

( * ) Notice: Subject to any disclaimer, the term of this patent is extended or adjusted under 35 U.S.C. 154(b) by 18 days.

(21) Appl. No.: 14/590,255

(22) Filed: Jan. 6, 2015

(65) Prior Publication Data

US 2015/0198214 A1  Jul. 16, 2015

(30) Foreign Application Priority Data

Jan. 10, 2014  (JP) .................................. 2014-003660

(51) Int. Cl.
*F16F 9/348* (2006.01)
*F16F 9/512* (2006.01)

(52) U.S. Cl.
CPC ............. *F16F 9/512* (2013.01); *F16F 9/3482* (2013.01); *F16F 9/3484* (2013.01); *F16F 9/3485* (2013.01)

(58) Field of Classification Search
CPC .......... F16F 9/3214; F16F 9/34; F16F 9/348; F16F 9/3482; F16F 9/3484; F16F 9/512
See application file for complete search history.

(56) References Cited

U.S. PATENT DOCUMENTS

| | | | | | |
|---|---|---|---|---|---|
| 2,225,986 A | * | 12/1940 | Glezen | ................... | F16F 9/348 188/314 |
| 3,837,445 A | * | 9/1974 | Pierle | ................... | F16F 9/3484 137/513.7 |
| 4,819,773 A | * | 4/1989 | Ito | ........................ | F16F 9/3484 188/282.5 |
| 4,972,929 A | * | 11/1990 | Ivers | ..................... | F16F 9/3484 188/282.6 |
| 5,332,069 A | * | 7/1994 | Murakami | ............ | F16F 9/3484 188/282.6 |
| 9,182,005 B2 | * | 11/2015 | Goldasz | ................. | F16F 9/348 |

FOREIGN PATENT DOCUMENTS

| | | |
|---|---|---|
| DE | 2059682 A1 | 6/1972 |
| DE | 3534298 A1 | 4/1987 |
| FR | 2693524 A1 | 1/1994 |
| JP | 322149 U | 3/1991 |
| JP | 3123132 U | 12/1991 |
| JP | 5-126198 A | 5/1993 |
| JP | 2002-13579 A | 1/2002 |
| JP | 2010-59994 A | 3/2010 |

OTHER PUBLICATIONS

English translation of the relevant part of the Communication dated Nov. 17, 2015, issued by the Japan Patent Office in corresponding Japanese Application No. 2014-003660.

\* cited by examiner

*Primary Examiner* — Anna Momper
(74) *Attorney, Agent, or Firm* — Sughrue Mion, PLLC

(57) ABSTRACT

A shock absorber includes a cylinder, a piston, and a piston rod. The piston includes a first valve and a second valve. The first valve includes a first leaf valve, a first valve seat portion, a second valve seat portion, and a first oil passage. The second valve includes a second leaf valve and a second oil passage. The first valve and the second valve are arranged in series.

12 Claims, 14 Drawing Sheets

SHOCK ABSORBER

CROSS-REFERENCE TO RELATED APPLICATIONS

The present application claims priority to and incorporates by reference the entire contents of Japanese Patent Application No. 2014-003660 filed in Japan on Jan. 10, 2014.

BACKGROUND OF THE INVENTION

1. Field of the Invention

The present invention relates to a shock absorber.

2. Description of the Related Art

Conventionally, there is a shock absorber that includes a leaf valve. For example, JP 5-126198 A discloses a technique for a valve structure of a shock absorber that prevents generation of cavitation by generating a back-pressure to a flow of operating oil so as to ensure a constant initial deflection of a leaf valve for back-pressure.

It is required to generate an appropriate damping force over the whole range including the range of extra slow speed in the shock absorber. However, it is difficult to ensure the compatibility between the attenuation characteristic in the range of extra slow speed and the attenuation characteristic in an ordinary range (from middle speed to high speed). For example, a leaf valve with a low rigidity may be employed to generate an appropriate damping force in the range of extra slow speed. In this case, there are problems such as reduction in durability.

SUMMARY OF THE INVENTION

An object of the present invention is to provide a shock absorber that can generate an appropriate damping force in a wide speed range including a range of extra slow speed.

According to one aspect of the present invention, a shock absorber includes a cylinder; a piston; and a piston rod, wherein the piston includes: a first valve that includes: a first leaf valve whose inner edge portion and outer edge portion in a radial direction of the piston are free ends; a first valve seat portion configured to support the inner edge portion of the first leaf valve from one side in an axial direction; a second valve seat portion configured to support the outer edge portion of the first leaf valve from another side in the axial direction; and a first oil passage, the first leaf valve opening and closing the first oil passage; and a second valve that includes: a second leaf valve one of whose inner edge portion and outer edge portion in the radial direction is a fixed end; and a second oil passage, the second leaf valve opening and closing the second oil passage, wherein the first valve is configured to open and generate a damping force corresponding to a piston speed of the piston by allowing the first leaf valve to separate from one of the first valve seat portion and the second valve seat portion corresponding to a moving direction of the piston in a state where the first leaf valve is supported by the other of the valve seat portions, the second valve is configured to open and generate a damping force corresponding to the piston speed by allowing the second leaf valve to deflect in a case where the moving direction of the piston is a predetermined direction, and the first valve and the second valve are arranged in series.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Hereinafter, a description will be given of a shock absorber according to an embodiment of the present invention in detail by referring to the accompanying drawings. This embodiment does not limit the invention. The constituent elements described below include various modifications that will readily occur to those skilled in the art, modifications substantially similar thereto, or what is called equivalent range thereof.

First Embodiment

Figure 1:
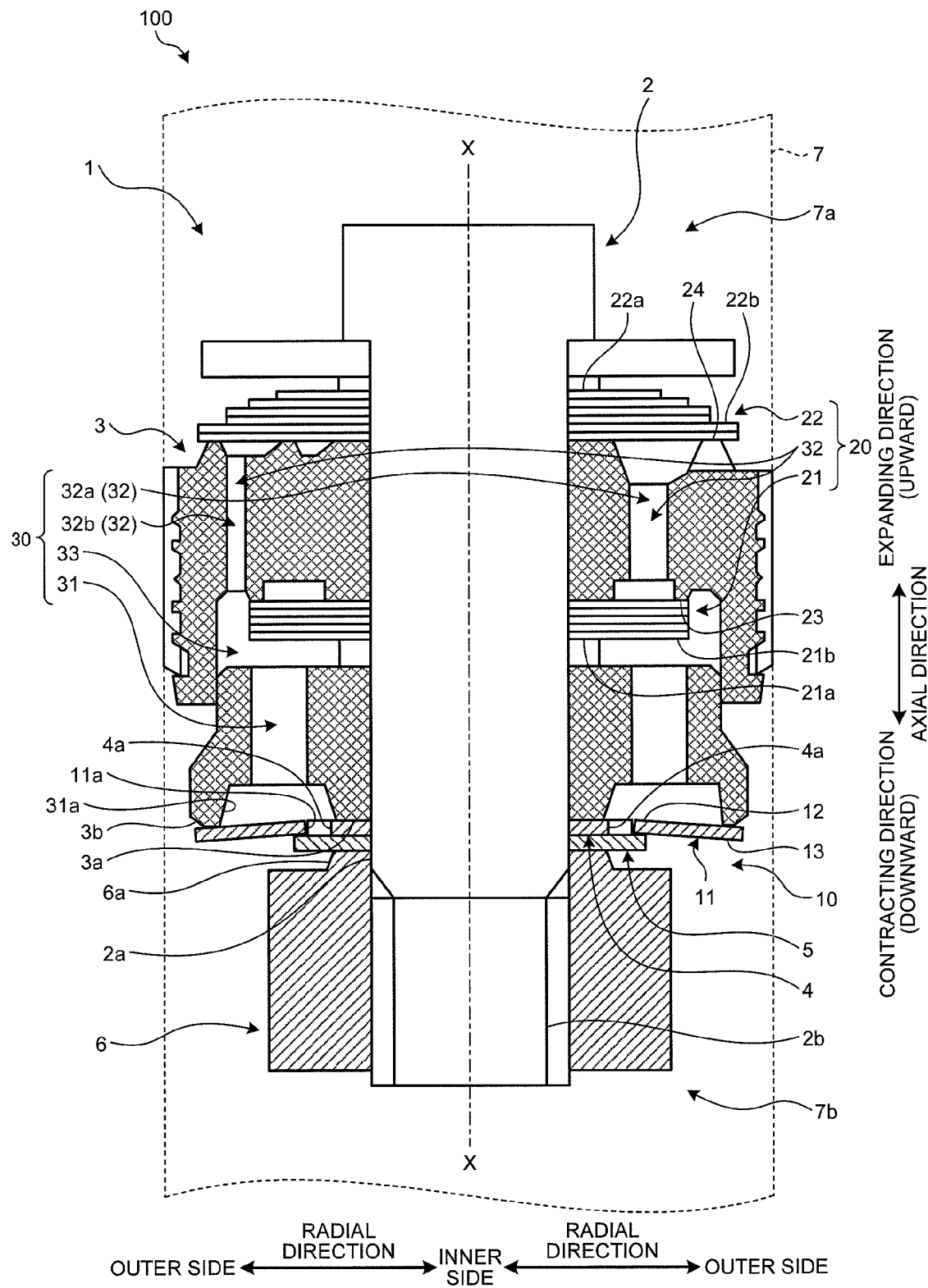
FIG. 1 is a main part cross-sectional view of a shock absorber according to a first embodiment.
Figure 2:
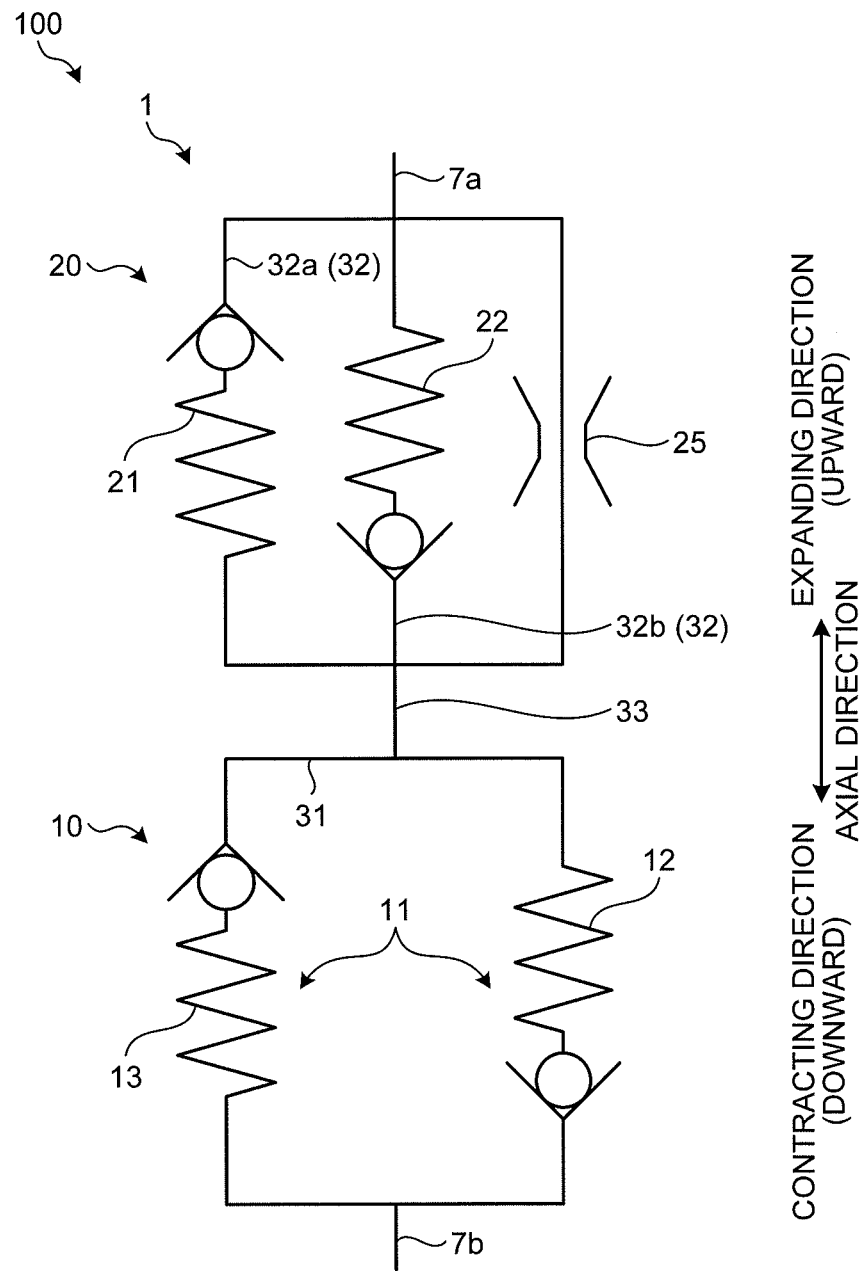
FIG. 2 is a diagram illustrating the function of the shock absorber according to the first embodiment.
Figure 3:
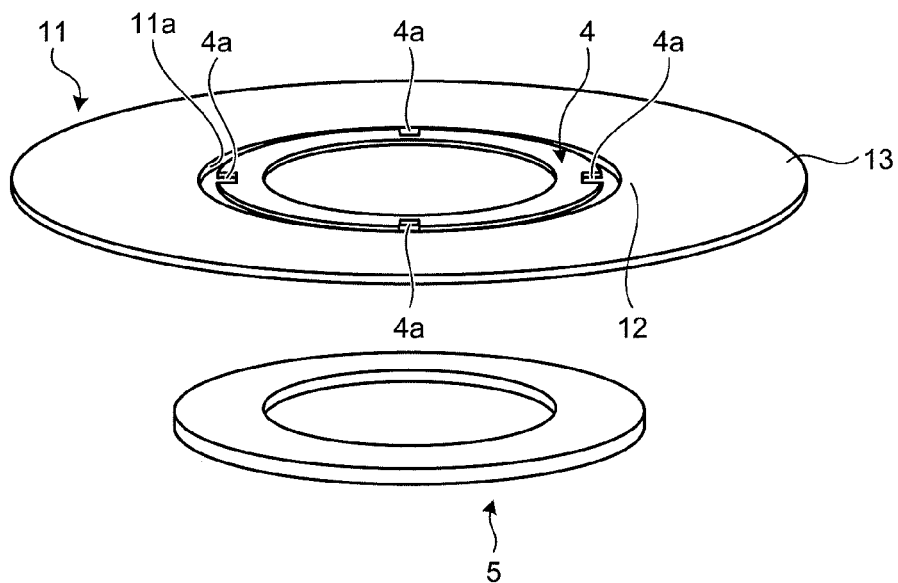
FIG. 3 is a perspective view illustrating the configuration members of the shock absorber according to the first embodiment.
Figure 4:
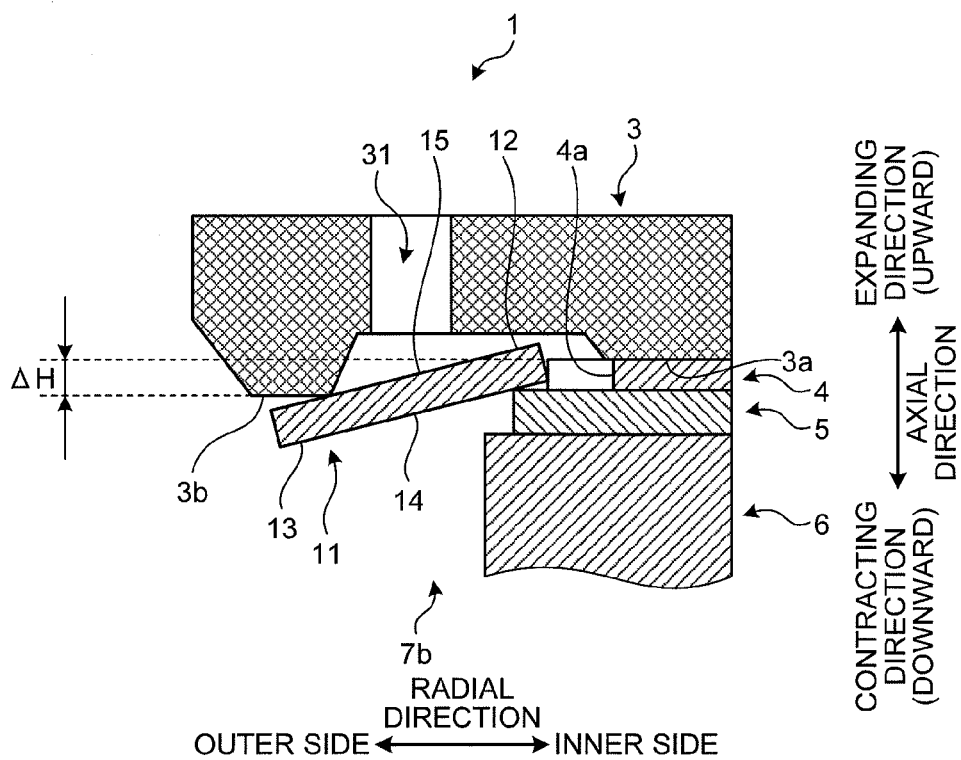
FIG. 4 is an enlarged view of a first valve of the shock absorber according to the first embodiment.
Figure 5:
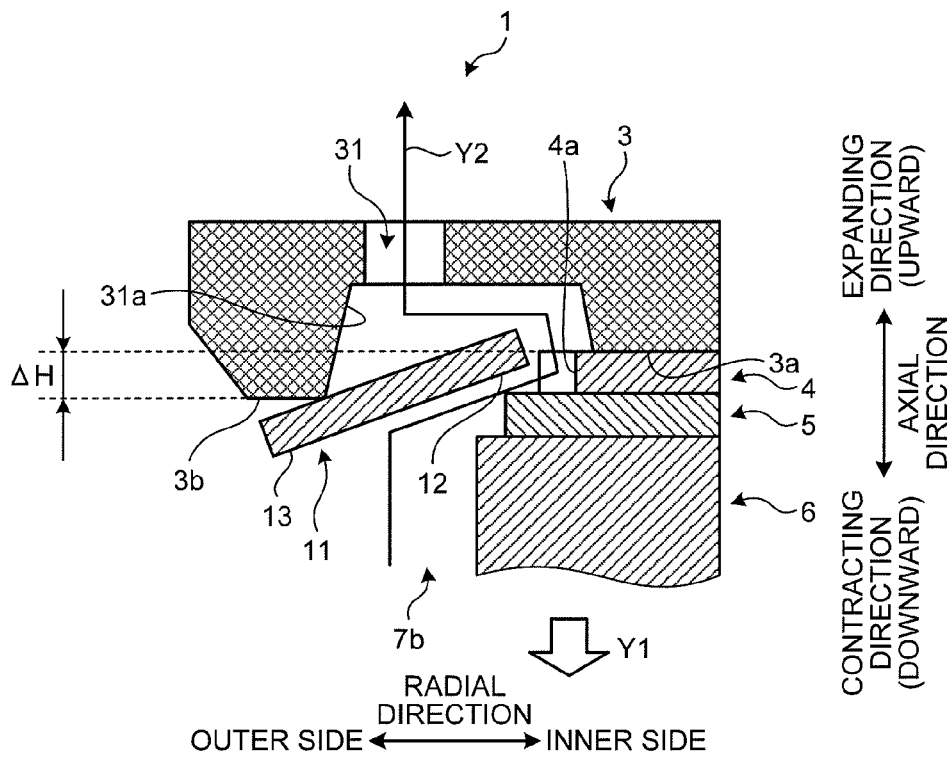
FIG. 5 is a diagram illustrating the operation during contraction of the shock absorber according to the first embodiment.
Figure 6:
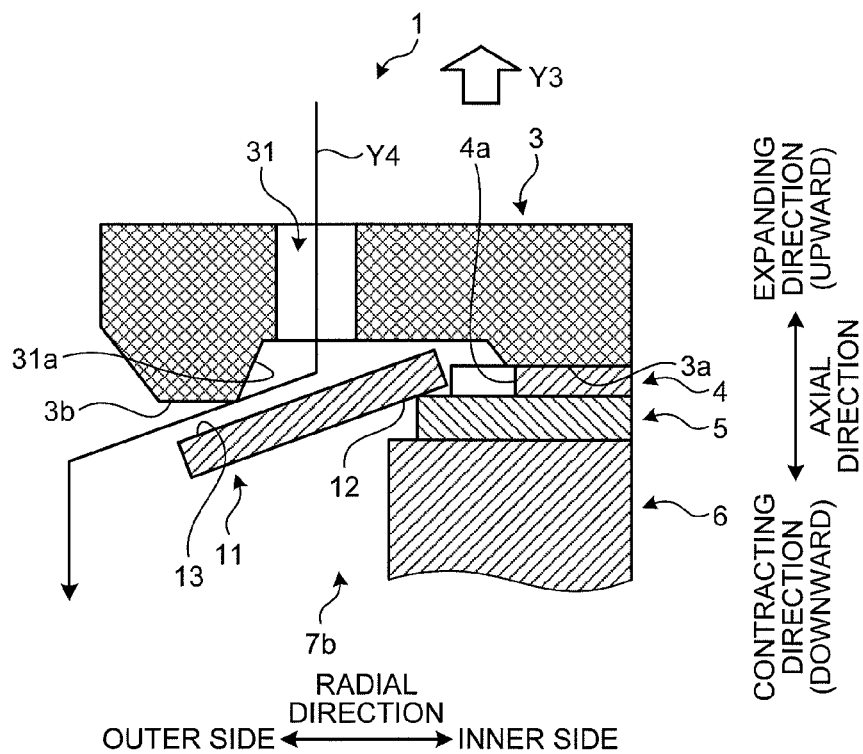
FIG. 6 is a diagram illustrating the operation during expansion of the shock absorber according to the first embodiment.
Figure 7:
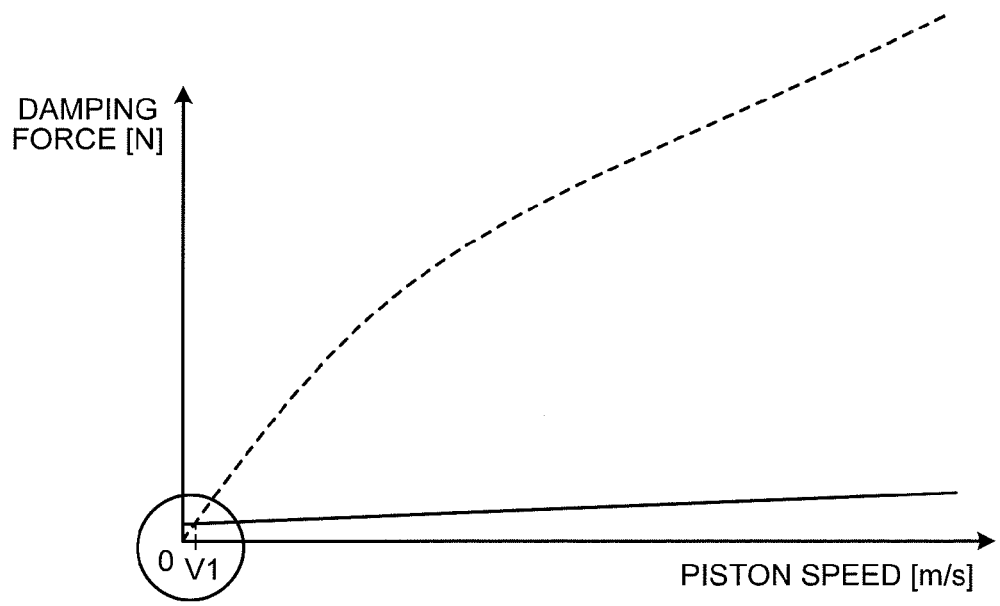
FIG. 7 is a graph illustrating characteristics of the first valve and a second valve according to the first embodiment.
Figure 8:
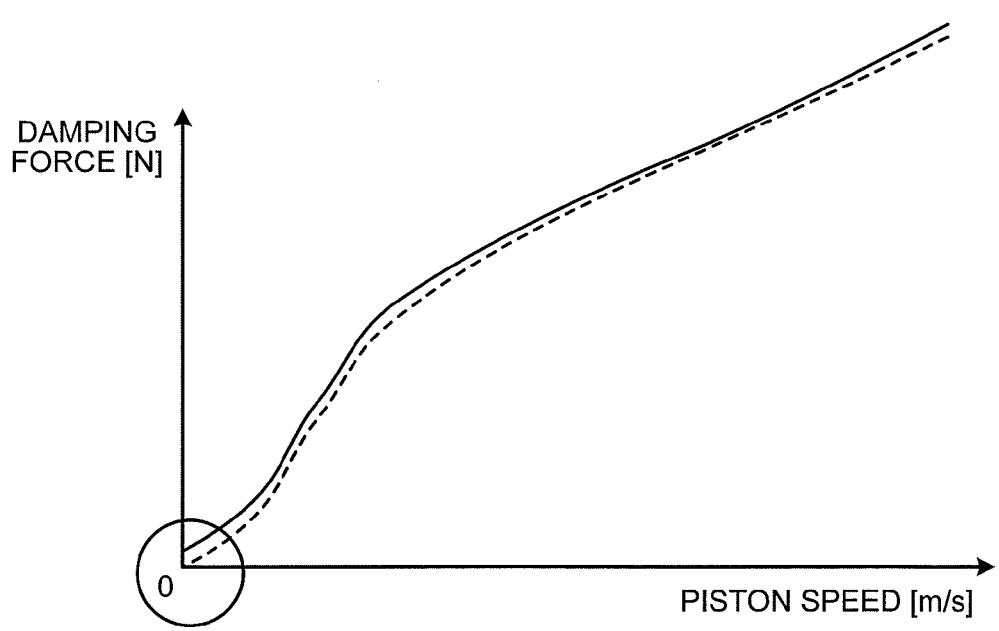
FIG. 8 is a graph illustrating a characteristic of the shock absorber according to the first embodiment.

A first embodiment will be described with reference to FIG. 1 to FIG. 10. This embodiment relates to a shock absorber. FIG. 1 is a main part cross-sectional view of the shock absorber according to the first embodiment of the present invention. FIG. 2 is a diagram illustrating the function of the shock absorber according to the first embodiment. FIG. 3 is a perspective view illustrating the configuration members of the shock absorber according to the first embodiment. FIG. 4 is an enlarged view of a first valve of the shock absorber according to the first embodiment. FIG. 5 is a diagram illustrating the operation during contraction of the shock absorber according to the first embodiment. FIG. 6 is a diagram illustrating the operation during expansion of the shock absorber according to the first embodiment. FIG. 7 is a graph illustrating characteristics of the first valve and a second valve according to the first embodiment. FIG. 8 is a graph illustrating a characteristic of the shock absorber according to the first embodiment.

A shock absorber 100 illustrated in FIG. 1 is a damping device that generates a damping force. In this embodiment, a description will be given of the case where the shock absorber 100 is used for a shock absorber of a vehicle as an example. The shock absorber 100 of the first embodiment includes a cylinder 7, a piston 1, and a piston rod 2. The piston 1 includes a first valve 10 and a second valve 20.

The piston 1 is arranged in the cylinder 7. The cylinder 7 is coupled to the wheel side (below the spring) of the vehicle, and internally includes a space portion that is filled with operating fluid such as oil. In the piston 1, a piston main body 3 has a cylindrical shape and has a through-hole extending in the axial direction. The piston rod 2 is secured to the piston main body 3 while being inserted into the through-hole of the piston main body 3. The piston rod 2 is coupled to the vehicle body side (above the spring) of the vehicle, and moves up and down together with the vehicle body side.

An oil passage 30 is disposed in the piston 1, and passes through the piston 1 in the axial direction. The oil passage 30 connects the space portion on one side and the space portion on the other side with respect to the piston 1 in the axial direction together. In this description, unless otherwise stated, the "axial direction" denotes the axial direction of the cylinder 7 and the piston 1, the "radial direction" denotes the radial direction perpendicular to the center axis line X of the cylinder 7 and the piston 1, and the "circumferential direction" denotes the circumferential direction around the center axis line X.

The oil passage 30 of this embodiment connects a space portion 7a and a space portion 7b together. The space portion 7a is a space portion on the upper side in the cylinder 7 with respect to the piston main body 3. The space portion 7b is a space portion on the lower side in the cylinder 7 with respect to the piston main body 3. The oil passage 30 is the passage of operating fluid formed inside of the piston main body 3, and includes a first oil passage 31, a second oil passage 32, and an intermediate oil passage 33.

The first valve 10 and the second valve 20 are open/close valves that close or open the oil passage 30. The first valve 10 and the second valve 20 are arranged in series along the flow passage of the operating fluid in the piston main body 3. The second valve 20 is a main valve, and controls a damping force in a wide range of a piston speed from a small piston speed up to a large piston speed. Here, the controls of the damping force by the first valve 10 or the second valve 20 include the control where the valve opens when the differential pressure before and after the first valve 10 or the second valve 20 becomes a predetermined pressure, the control where the valve opening degree changes depending on the magnitude of the piston speed so as to adjust the flow rate of the operating fluid or the damping force to be generated, and similar control.

The first valve 10 is an extra slow speed valve, and can control a damping force in a range of the piston speed relatively smaller than the range of the piston speed covered by the second valve 20. The first valve 10 according to this embodiment can appropriately generate a damping force when the piston 1 starts to move, that is, at a piston speed that is an extreme low speed. The first valve 10 includes a first leaf valve 11, the first oil passage 31, a leaf sheet 5 as a first valve seat portion, and an outer protrusion 3b as a second valve seat portion. The first leaf valve 11 includes respective free ends of an inner edge portion 12 in the radial direction and an outer edge portion 13 in the radial direction. The first valve 10 opens and closes the first oil passage 31 using the first leaf valve 11. Here, the inner edge portion 12 denotes the region in the first leaf valve 11 biased to the inside in the radial direction and includes the innermost periphery. The outer edge portion 13 denotes the region in the first leaf valve 11 biased to the outside in the radial direction and includes the outermost periphery.

The second valve 20 includes second leaf valves 21 and 22, the second oil passage 32, and valve seats 23 and 24. The second valve 20 opens and closes the second oil passage 32 using the second leaf valves 21 and 22. The expansion-side second leaf valve 21 has one of the edge portions of an inner edge portion 21a and an outer edge portion 21b in the radial direction as a fixed end. Similarly, the contraction-side second leaf valve 22 has one of the edge portions of an inner edge portion 22a and an outer edge portion 22b in the radial direction as a fixed end. Here, the fixed end is the edge portion of the leaf valves 21 and 22 secured to the piston main body 3 even in the case where pressures are applied to the leaf valves 21 and 22. In other words, the fixed end is the edge portion fixed to the piston main body 3 relatively immovable in the axial direction. In this embodiment, in the second leaf valves 21 and 22, the respective inner edge portions 21a and 22a are the fixed ends and the respective outer edge portions 21b and 22b are the free ends. Here, the free end is the edge portion that separates from the piston main body 3 when pressures are applied to the leaf valves 21 and 22 from a predetermined direction. In other words, the free end is the edge portion relatively movable in the axial direction with respect to the piston main body 3.

The expansion-side second leaf valve 21 is the valve that becomes a valve-opening state when the piston 1 moves in the expanding direction and becomes a valve-closed state when the piston 1 moves in the contracting direction. That is, the second valve 20 opens and generates a damping force corresponding to the piston speed by deflection of the expansion-side second leaf valve 21 in the case where the moving direction of the piston 1 is the expanding direction (the predetermined direction). On the other hand, the contraction-side second leaf valve 22 is a valve that becomes a valve-opening state when the piston 1 moves in the contracting direction and becomes a valve-closed state when the piston 1 moves in the expanding direction. That is, the second valve 20 opens and generates a damping force corresponding to the piston speed by deflection of the contraction-side second leaf valve 22 in the case where the moving direction of the piston 1 is the contracting direction (the predetermined direction). In this embodiment, the piston 1 moves in the upward direction relatively with respect to the cylinder 7 when the shock absorber 100 expands.

Accordingly, in this embodiment, movement of the piston 1 in the upward direction relatively with respect to the cylinder 7 is referred to as movement in the expanding direction. Movement of the piston 1 in the downward direction relatively with respect to the cylinder 7 is referred to as movement in the contracting direction.

As illustrated in FIG. 2, in the shock absorber 100 of this embodiment, the first valve 10 and the second valve 20 generate the damping forces for each of the movement in the expanding direction and the movement in the contracting direction of the piston 1. For example, when the piston 1 moves in the expanding direction, the expansion-side second leaf valve 21 of the second valve 20 adjusts the damping force and functions as an expansion main valve. On the other hand, when the piston 1 moves in the contracting direction, the contraction-side second leaf valve 22 adjusts the damping force and functions as a contraction main valve. In the shock absorber 100 of this embodiment, an orifice 25 is disposed in parallel to the expansion-side second leaf valve 21 and the contraction-side second leaf valve 22.

The first leaf valve 11 adjusts the damping force by the outer edge portion 13 and functions as an expansion extra slow speed valve when the piston 1 moves in the expanding direction. On the other hand, the first leaf valve 11 adjusts the damping force by the inner edge portion 12 and functions as a contraction extra slow speed valve where when the piston 1 moves in the contracting direction. Even in the case where the second valve 20 is closed, the first valve 10 and the space portion 7a on the upper side of the cylinder 7 are connected with each other via the orifice 25. Accordingly, even in the case where the piston 1 moves in the direction of the expanding direction or the contracting direction, a differential pressure acts on the first leaf valve 11. The first leaf valve 11 is maintained in the valve-closed state and regulates the flow of the operating fluid until the differential pressure before and after the first leaf valve 11 reaches a predetermined threshold. Accordingly, the first leaf valve 11 can generate the damping force when the piston speed is an extra slow speed (for example, a speed equal to or less than 0.02 m/s), for example, when the piston 1 starts to move.

The first leaf valve 11 opens when the differential pressure equal to or more than a certain pressure acts on the first leaf valve 11. The first leaf valve 11 adjusts the damping force by, for example, changing the valve opening degree corresponding to the piston speed. The first leaf valve 11 is, for example, configured to open at a piston speed lower than the piston speed at which the second valve 20 opens. In this case, the shock absorber 100 can adjust the damping force using the first valve 10 in a state where the second valve 20 is closed.

Referring again to FIG. 1, the first oil passage 31 is an oil passage that connects the first leaf valve 11 and the second valve 20. The first oil passage 31 of this embodiment is an annularly-shaped oil passage formed over the whole circumference of the piston main body 3 and surrounds the piston rod 2. The second oil passage 32 is an oil passage that connects the first oil passage 31 and the outside of the piston 1. The second oil passage 32 includes an expansion-side oil passage 32a and a contraction-side oil passage 32b. In the second oil passage 32, the expansion-side oil passage 32a is an oil passage through which the operating fluid mainly flows when the piston 1 moves in the expanding direction. In the second oil passage 32, the contraction-side oil passage 32b is an oil passage through which the operating fluid mainly flows when the piston 1 moves in the contracting direction. In this embodiment, the flow passage cross-sectional area of the expansion-side oil passage 32a is larger than the flow passage cross-sectional area of the contraction-side oil passage 32b.

The first oil passage 31 and the second oil passage 32 are connected with each other via the intermediate oil passage 33. The first oil passage 31 connects the space portion 7b on the lower side with respect to the piston main body 3 and the intermediate oil passage 33. The expansion-side oil passage 32a and the contraction-side oil passage 32b each connect the intermediate oil passage 33 and the space portion 7a on the upper side with respect to the piston main body 3. The expansion-side oil passage 32a and the contraction-side oil passage 32b are connected with each other via the intermediate oil passage 33 inside of the piston main body 3.

The expansion-side second leaf valve 21 is disposed at the opening portion on the intermediate oil passage 33 side of the expansion-side oil passage 32a. The expansion-side second leaf valve 21 in this embodiment is an annularly-shaped leaf valve. In the expansion-side second leaf valve 21, the inner edge portion 21a in the radial direction is secured to the piston main body 3 as a fixed end while the outer edge portion 21b is a free end. The outer edge portion 21b of the expansion-side second leaf valve 21 is supported by the valve seat 23. In the valve seat 23, a cutout portion that functions as the orifice 25 (see FIG. 2) is formed. the expansion-side oil passage 32a and the intermediate oil passage 33 are communicated with each other via this cutout portion even in the valve-closed state where the expansion-side second leaf valve 21 is seated on the valve seat 23. The expansion-side second leaf valve 21 opens or closes corresponding to the differential pressure between the expansion-side oil passage 32a and the intermediate oil passage 33, so as to open or close the expansion-side oil passage 32a.

The contraction-side second leaf valve 22 is arranged corresponding to the opening portion on the upper space portion 7a side of the expansion-side oil passage 32a and the contraction-side oil passage 32b. The contraction-side second leaf valve 22 of this embodiment is an annularly-shaped leaf valve. In the contraction-side second leaf valve 22, the inner edge portion 22a in the radial direction is secured to the piston main body 3 as a fixed end while the outer edge portion 22b is a free end. The outer edge portion 22b of the contraction-side second leaf valve 22 is supported by the valve seat 24. In the valve seat 24, a cutout portion that functions as the orifice 25 is formed. The expansion-side oil passage 32a and the upper space portion 7a are communicated with each other via this cutout portion even in the valve-closed state where the contraction-side second leaf valve 22 is seated on the valve seat 24. The contraction-side second leaf valve 22 opens or closes corresponding to the differential pressure between the contraction-side oil passage 32b and the upper space portion 7a so as to open or close the contraction-side oil passage 32b.

The first leaf valve 11 opens or closes the first oil passage 31. The first leaf valve 11 of this embodiment is disposed at the end portion on the lower space portion 7b side of the first oil passage 31, in other words, at the end portion in the contracting direction. The first leaf valve 11 ensures or cuts communication between the first oil passage 31 and the lower space portion 7b.

The first leaf valve 11 includes the respective free ends of the inner edge portion 12 and the outer edge portion 13 in the radial direction. The first leaf valve 11 of this embodiment is a plate-shaped member with a through-hole 11a. As one example of the plate-shaped member with the through-hole 11a, as illustrated in FIG. 3, the first leaf valve 11 according to this embodiment is formed as an annularly-shaped and flat plate-shaped leaf valve. The first leaf valve 11 is disposed in the piston main body 3 together with a centering sheet 4 and the leaf sheet 5. The centering sheet 4 and the leaf sheet 5 are each an annularly-shaped and flat plate-shaped member.

The centering sheet 4 reduces the eccentricity of the first leaf valve 11. The outer diameter of the centering sheet 4 is slightly smaller than the inner diameter of the first leaf valve 11. In this embodiment, the thickness of the centering sheet 4 and the thickness of the first leaf valve 11 are equal to each other. As illustrated in FIG. 1, the centering sheet 4 is arranged on the radially inner side of the first leaf valve 11, and is pressed together with the first leaf valve 11 toward the piston main body 3 by the leaf sheet 5. As illustrated in FIG. 1 and FIG. 3, the centering sheet 4 has a cutout portion 4a. A plurality of the cutout portions 4a are arranged at a predetermined interval in the outer peripheral portion of the centering sheet 4. The centering sheet 4 of this embodiment has four of the cutout portions 4a arranged at an equal interval in the circumferential direction.

The leaf sheet 5 is a member that supports the inner edge portion 12 in the radial direction of the first leaf valve 11. The outer diameter of the leaf sheet 5 is larger than the inner diameter of the first leaf valve 11, and is smaller than the outer diameter of the first leaf valve 11. The outer diameter of the leaf sheet 5 of this embodiment is slightly larger than the inner diameter of the first leaf valve 11. The inner diameter of the leaf sheet 5 is smaller than the outer diameter of the centering sheet 4. In this embodiment, the inner diameter of the centering sheet 4 and the inner diameter of the leaf sheet 5 are each equal to or slightly larger than the outer diameter of a shaft portion 2a of the piston rod 2.

Into each of the centering sheet 4 and the leaf sheet 5, the shaft portion 2a of the piston rod 2 is inserted. The centering sheet 4 is arranged on the piston main body 3 side with respect to the leaf sheet 5. The first leaf valve 11 is arranged to have the inner peripheral surface facing the outer peripheral surface of the centering sheet 4 in the radial direction, in other words, arranged such that the centering sheet 4 is inserted into the through-hole 11a of the first leaf valve 11. The centering sheet 4, the leaf sheet 5, and the first leaf valve 11 are arranged coaxially with the center axis line X.

As illustrated in FIG. 1, the leaf sheet 5 is pressed in the axial direction toward the piston main body 3 by a fixing member 6. The fixing member 6 is, for example, a nut-shaped member threadably mounted on the shaft portion 2a. In the distal end portion of the shaft portion 2a, a male thread portion 2b is formed. The fixing member 6 has a female thread portion corresponding to the male thread portion 2b, and is threadably mounted on the male thread portion 2b. Fastening the fixing member 6 to the male thread portion 2b causes a distal end 6a of the fixing member 6 to press the leaf sheet 5 toward the piston main body 3. Accordingly, the leaf sheet 5 presses the centering sheet 4 and the first leaf valve 11 toward the piston main body 3. The leaf sheet 5 is supported by the fixing member 6, and functions as a supporting member that supports the first leaf valve 11 being pressed in the axial direction toward the piston 1. In this embodiment, the fixing member 6 is simply a member that presses the leaf sheet 5, and is not included in the configuration elements of the first valve 10. The position adjustment of the first leaf valve 11 is performed by the centering sheet 4 and the leaf sheet 5. Accordingly, even when variation in fastening height of the fixing member 6 or similar variation occurs, the attenuation characteristic of the first leaf valve 11 is not affected.

On the lower surface (the end surface in the contracting direction) of the piston main body 3, an inner protrusion 3a and an outer protrusion 3b are disposed. The inner protrusion 3a is a protrusion that is disposed on the inner side in the radial direction with respect to the first oil passage 31. The outer protrusion 3b is a protrusion that is disposed on the outer side in the radial direction with respect to the first oil passage 31. At the lower end, that is, the end portion on the lower space portion 7b side in the first oil passage 31, a diameter enlarged portion 31a is disposed. In the diameter enlarged portion 31a, the cross-sectional area of the first oil passage 31 is enlarged toward the contracting direction in a tapered shape. The inner protrusion 3a constitutes the tapered surface on the inner side of the diameter enlarged portion 31a in the radial direction. The outer protrusion 3b constitutes the tapered surface on the outer side of the diameter enlarged portion 31a in the radial direction.

The outer protrusion 3b functions as the second valve seat portion that supports the outer edge portion 13 of the first leaf valve 11. That is, in this embodiment, the piston main body 3 of the piston 1 functions as the second valve seat portion that supports the outer edge portion 13. The inner protrusion 3a functions as a supporting portion that supports the leaf sheet 5 and the centering sheet 4, which are pressed by the fixing member 6. As described with reference to FIG. 4, in this embodiment, the distal end surface of the inner protrusion 3a and the distal end surface of the outer protrusion 3b are different in position in the axial direction. Accordingly, a preset load is applied to the first leaf valve 11.

As illustrated in FIG. 4, the distal end surface of the inner protrusion 3a and the distal end surface of the outer protrusion 3b are each a planar surface perpendicular to the axial direction. The position in the axial direction of the distal end surface of the inner protrusion 3a and the position in the axial direction of the distal end surface of the outer protrusion 3b are different from each other. The distal end surface of the outer protrusion 3b projects downward, that is, in the contracting direction more than the distal end surface of the inner protrusion 3a. In other words, a level difference ΔH is disposed between the distal end surface of the inner protrusion 3a and the distal end surface of the outer protrusion 3b.

Accordingly, the first leaf valve 11 pressed toward the piston main body 3 by the leaf sheet 5 is deformed such that the inner edge portion 12 is positioned upward, that is, on the expanding direction side with respect to the outer edge portion 13. That is, the cross-sectional shape of the first leaf valve 11 is the shape inclined toward the piston main body 3 side from the outer side to the inner side in the radial direction. In the following description, the state of the first leaf valve 11 thus deformed by being pressed by the leaf sheet 5 is referred to as a "preset state" and the shape of the first leaf valve 11 in the preset state is referred to as a "preset shape".

In the first leaf valve 11 in the preset state, the inner edge portion 12 is supported from one side in the axial direction while the outer edge portion 13 is supported from the other side in the axial direction. In this embodiment, the inner edge portion 12 of the first leaf valve 11 is supported by the leaf sheet 5 from the contracting direction side while the outer edge portion 13 is supported by the outer protrusion 3b from the expanding direction side. The leaf sheet 5 is arranged to allow contact with the first leaf valve 11, and functions as the first valve seat portion, which supports the inner edge portion 12 of the first leaf valve 11 in the axial direction. The leaf sheet 5 supports the inner edge portion 12 from the contracting direction side in the axial direction. In contrast, the piston main body 3 functions as the second valve seat portion, which supports the outer edge portion 13 from the other side (in this embodiment, the expanding direction side) in the axial direction. The inner edge portion 12 of the first leaf valve 11 is the free end that is supported by the leaf sheet 5 and is separable from the leaf sheet 5 in the axial direction corresponding to the pressure. The outer edge portion 13 of the first leaf valve 11 is the free end that is supported by the piston main body 3 and is separable from the piston main body 3 in the axial direction corresponding to the pressure.

The first leaf valve 11 is deformed with being pressed by the leaf sheet 5 from one side in the axial direction and pressed by the outer protrusion 3b from the other side in the axial direction. Accordingly, the first leaf valve 11 is pressed toward the leaf sheet 5 and the outer protrusion 3b by its own restoring force. This pressing force, that is, the preset load maintains the first leaf valve 11 in the valve-closed state until the differential pressure between the first oil passage 31 and the lower space portion 7b becomes equal to or more than a certain value.

Since the first leaf valve 11 is deformed into the preset shape, a surface 14 on the contracting direction side of the first leaf valve 11 has linear contact with the corner portion of the leaf sheet 5. In the first leaf valve 11, a surface 15 on the expanding direction side has linear contact with the corner portion of the outer protrusion 3b. That is, the first leaf valve 11 in this embodiment has linear contact with each of the outer protrusion 3b as the second valve seat portion and the leaf sheet 5 as the first valve seat portion. The first leaf valve 11 is preferred to have linear contact with at least any one of the first valve seat portion and the second valve seat portion, more preferably, to have linear contact with both of the seat portions.

Operation in Case where Piston Moves in Contracting Direction

A description will be given of the operation in the case where the piston 1 moves in the contracting direction (the direction of an arrow Y1 in FIG. 5) with reference to FIG. 1 and FIG. 5. In the case where the piston 1 moves forward in the contracting direction, the pressure in the lower space portion 7b becomes higher than the pressure in the first oil passage 31. By this differential pressure, the first leaf valve 11 is pressed toward the expanding direction. The first leaf valve 11 is maintained in the valve-closed state in the case where the force caused by the differential pressure is less than the force corresponding to the preset load. When the first leaf valve 11 is closed, the oil passage 30 is closed so that the upper space portion 7a and the lower space portion 7b are disconnected from each other. Accordingly, in the case where the piston speed is a low speed, the first leaf valve 11 regulates the flow of the operating fluid between the upper space portion 7a and the lower space portion 7b so as to generate a damping force.

When the force caused by the differential pressure becomes equal to or more than a force corresponding to the preset load, the inner edge portion 12 of the first leaf valve 11 is displaced in the expanding direction. Accordingly, the first leaf valve 11 deforms to be deflected having the contact portion with the outer protrusion 3b as a fulcrum. By the deformation of the first leaf valve 11 due to the differential pressure, the inner edge portion 12 of the first leaf valve 11 moves away from the leaf sheet 5 and opens. That is, in the case where the piston 1 moves in the contracting direction, the first leaf valve 11 separates from the leaf sheet 5 as the first valve seat portion so as to open while being supported by the outer protrusion 3b as the second valve seat portion. Accordingly, as illustrated by an arrow Y2 in FIG. 5, the operating fluid in the lower space portion 7b flows in the first oil passage 31 via the gap between the first leaf valve 11 and the leaf sheet 5. In the portion where the cutout portion 4a of the centering sheet 4 is disposed, the operating fluid come out from between the inner edge portion 12 and the leaf sheet 5 passes through the cutout portion 4a and flows to the first oil passage 31.

The operating fluid that has flowed in the first oil passage 31 flows in the intermediate oil passage 33 (see FIG. 1) and flows in the expansion-side oil passage 32a via the cutout portion (the orifice 25) of the valve seat 23. The operating fluid in the expansion-side oil passage 32a flows out to the upper space portion 7a via the cutout portion (the orifice 25) of the valve seat 24. That is, the operating fluid in the lower space portion 7b flows to the upper space portion 7a from the first oil passage 31 through the intermediate oil passage 33 and the expansion-side oil passage 32a when the first leaf valve 11 is opened even in the case where the piston speed is an extra slow speed. Accordingly, the first leaf valve 11 can control the damping force by deforming corresponding to the piston speed (the differential pressure) to adjust the size of the gap with the leaf sheet 5.

The operating fluid that has flowed in the first oil passage 31 from the lower space portion 7b also flows in the contraction-side oil passage 32b from the intermediate oil passage 33. Accordingly, the pressure in the contraction-side oil passage 32b becomes higher than the pressure in the upper space portion 7a. When this differential pressure reaches a predetermined threshold, the contraction-side second leaf valve 22 opens. When the contraction-side second leaf valve 22 opens, the adjustment of the damping force is performed mainly by the contraction-side second leaf valve 22. Even in the state where the contraction-side second leaf valve 22 is opened, the first leaf valve 11 generates a damping force. Accordingly, the sum of the damping force generated by the first leaf valve 11 and the damping force generated by the contraction-side second leaf valve 22 becomes the damping force of the shock absorber 100.

Operation in Case where Piston Moves in Expanding Direction

A description will be given of the operation in the case where the piston moves forward in the expanding direction (the direction of an arrow Y3 in FIG. 6) with reference to FIG. 1 and FIG. 6. With reference to FIG. 1, in the case where the piston 1 moves forward in the expanding direction, the operating fluid in the upper space portion 7a flows in the expansion-side oil passage 32a via the cutout portion of the valve seat 24. The operating fluid in the expansion-side oil passage 32a flows in the intermediate oil passage 33 via the cutout portion of the valve seat 23, and further flows to the first oil passage 31. Accordingly, the pressure in the first oil passage 31 becomes higher than the pressure of the lower space portion 7b. The first leaf valve 11 is maintained in the valve-closed state in the case where the force caused by the differential pressure between the first oil passage 31 and the lower space portion 7b is less than the force corresponding to the preset load. Accordingly, in the case where the piston speed is a low speed, the first leaf valve 11 regulates the flow of the operating fluid between the upper space portion 7a and the lower space portion 7b so as to generate a damping force.

When the force caused by the differential pressure becomes equal to or more than the force corresponding to the preset load, the outer edge portion 13 of the first leaf valve 11 is displaced in the contracting direction as illustrated in FIG. 6. Accordingly, the first leaf valve 11 deforms to be deflected having the contact portion with the leaf sheet 5 as a fulcrum. By the deformation of the first leaf valve 11 due to the differential pressure, the outer edge portion 13 of the first leaf valve 11 moves away from the outer protrusion 3b and opens. That is, in the case where the piston 1 moves in the expanding direction, the first leaf valve 11 separates from the outer protrusion 3b as the second valve seat portion so as to open while being supported by the leaf sheet 5 as the first valve seat portion. Accordingly, as illustrated by an arrow Y4 in FIG. 6, the operating fluid in the first oil passage 31 flows out to the lower space portion 7b via the gap between the first leaf valve 11 and the outer protrusion 3b.

That is, the operating fluid in the upper space portion 7a flows to the lower space portion 7b from the expansion-side oil passage 32a through the intermediate oil passage 33 and the first oil passage 31 when the first leaf valve 11 is opened even in the state where the second valve 20 is closed. Accordingly, the first leaf valve 11 can control the damping force by deforming corresponding to the piston speed (the differential pressure) to adjust the size of the gap with the outer protrusion 3b.

Here, the operating fluid that has flowed in the expansion-side oil passage 32a from the upper space portion 7a increases the pressure of the expansion-side oil passage 32a compared with the pressure of the intermediate oil passage 33. When this differential pressure reaches a predetermined threshold, the expansion-side second leaf valve 21 opens. When the expansion-side second leaf valve 21 opens, the adjustment of the damping force is performed mainly by the expansion-side second leaf valve 21. Even in the state where the expansion-side second leaf valve 21 is opened, the first leaf valve 11 generates a damping force. Accordingly, the sum of the damping force generated by the first leaf valve 11 and the damping force generated by the expansion-side second leaf valve 21 becomes the damping force of the shock absorber 100.

The first leaf valve 11 and the second valve 20 in this embodiment control the damping force by the opening and closing operation as described above. As described with reference to FIG. 9 and FIG. 10 below, the first leaf valve 11 has the advantage that allows controlling the damping force by opening at a low piston speed while ensuring the rigidity and the durability of the first leaf valve 11 itself.

Figure 9:
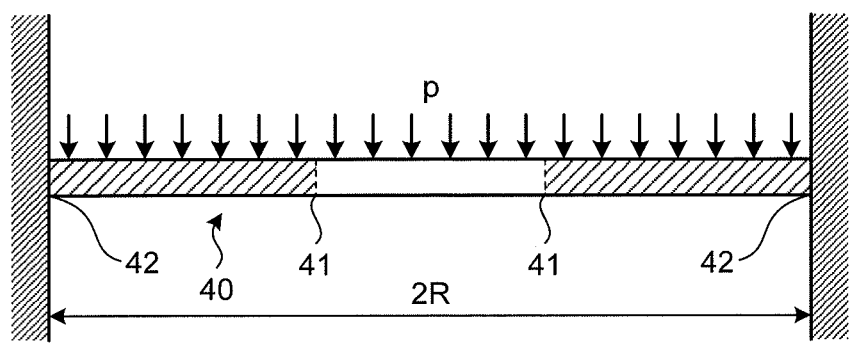
FIG. 9 is a diagram schematically illustrating a leaf valve whose end portion on the outer peripheral side is a fixed end.

FIG. 9 is a diagram schematically illustrating a leaf valve whose edge portion on the outer peripheral side is a fixed end. In an annularly-shaped leaf valve 40, an outer edge portion 42 is a fixed end and an inner edge portion 41 is a free end in the radial direction. A deflection amount $\delta$ of the annularly-shaped the leaf valve 40 can be approximated as the deflection amount of the beam whose both ends are fixed ends. The deflection amount $\delta$ in the case where a uniformly-distributed load p is applied to the leaf valve 40 as illustrated in FIG. 9 can be obtained by following Formula (1).

$$\delta = R^4 \times p / 64 \times D \quad (1)$$

Here, R denotes the radius of the leaf valve 40 and D denotes the eigenvalue determined by the geometrical moment of inertia and the Young's modulus of the leaf valve 40.

Figure 10:
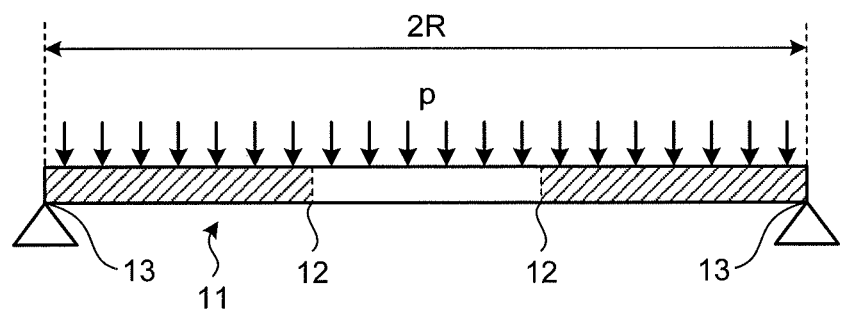
FIG. 10 is a diagram schematically illustrating a first leaf valve according to the first embodiment.

FIG. 10 is a diagram schematically illustrating the first leaf valve according to the first embodiment. In the first leaf valve 11 according to this embodiment, the inner edge portion 12 and the outer edge portion 13 are each a free end. Accordingly, a deflection amount $\delta 1$ of the first leaf valve 11 can be approximated as the deflection amount of the simple beam whose both ends are not restrained. The deflection amount $\delta 1$ in the case where the uniformly-distributed load p is applied to the first leaf valve 11 as illustrated in FIG. 10 can be obtained by following Formula (2).

$$\delta 1 = (5+v) \times R^4 \times p / 64 (1+v) \times D \quad (2)$$

Assuming that a Poisson's ratio $v$ of steel is 0.3, the deflection amount $\delta 1$ of the first leaf valve 11 is about four times larger than the deflection amount $\delta$ of the leaf valve 40. That is, under the same differential pressure, the deflection amount $\delta 1$ of the first leaf valve 11 is about four times larger than the deflection amount $\delta$ of the leaf valve 40 where the outer edge portion 42 is the fixed end. In other words, the gradient of the damping force by the first leaf valve 11 with respect to the piston speed is a quarter of the gradient of the damping force by the leaf valve 40 with respect to the piston speed. Accordingly, the first leaf valve 11 can, for example, be deflected more even while having the same rigidity as that of the leaf valve 40 or ensure the same deflection amount even while having a higher rigidity than that of the leaf valve 40. That is, the first leaf valve 11 of this embodiment has the advantage that allows controlling the damping force by opening at a low piston speed while ensuring the rigidity and the durability.

A description will be given of the attenuation characteristics of the shock absorber 100 with reference to FIG. 7 and FIG. 8. In FIG. 7, the horizontal axis denotes the piston speed [m/s] while the vertical axis denotes the damping force [N]. In FIG. 7, the solid line denotes the damping force characteristic of the first leaf valve 11 while the dashed line denotes the damping force characteristic of the second valve 20. The first leaf valve 11 in this embodiment generates a damping force from the start of movement of the piston 1. On the other hand, the second valve 20 does not generate a damping force or generates only a small damping force even when a damping force is generated at the start of movement of the piston 1. Accordingly, in the speed range of the piston speed lower than a predetermined speed V1, the damping force (the solid line) generated by the first leaf valve 11 is larger than the damping force (the dashed line) generated by the second valve 20 in this speed range. Accordingly, in the range of the piston speed lower than the predetermined speed V1, the first valve 10 mainly controls the damping force. On the other hand, in the speed range of the piston speed higher than the predetermined speed V1, the damping force generated by the second valve 20 is larger than the damping force generated by the first leaf valve 11 in this speed range. Accordingly, in the speed range of the piston speed higher than the predetermined speed V1, the second valve 20 mainly controls the damping force.

The first leaf valve 11 has the free ends on both ends in the radial direction, thus opening at a low piston speed. Additionally, the first leaf valve 11 has a larger deflection amount and a smaller gradient of the damping force compared with the leaf valve 40 whose one end portion is the fixed end. As illustrated in FIG. 7, the damping force generated by the first leaf valve 11 illustrates the damping force characteristic that has a smaller increased amount with respect to an increase in piston speed compared with the damping force generated by the second valve 20, and is close to a flat line. Accordingly, the first leaf valve 11 is less likely to affect the attenuation characteristic of the piston speed in the middle to high speed range.

In FIG. 8, the dashed line denotes the attenuation characteristic of the second valve 20 alone. The solid line denotes the attenuation characteristic of the shock absorber 100 by the combination of the first leaf valve 11 and the second valve 20. As seen from FIG. 8, the shock absorber 100 can generate the damping force in the range of the low speed at which the piston speed is close to 0 and can generate the damping force mainly corresponding to the attenuation characteristic of the second valve 20 in the range of the piston speed equal to or more than a certain speed. Accordingly, the shock absorber 100 of this embodiment has both of the damping force characteristic corresponding to the wide range of the piston speed by the second valve 20 and the damping force characteristic in the range of the extra slow speed by the first valve 10.

The first leaf valve 11 according to this embodiment has linear contact with each of the outer protrusion 3*b* as the second valve seat portion and the leaf sheet 5 as the first valve seat portion. As described below, this allows reducing generation of abnormal noise or similar trouble when the first valve 10 opens. Firstly, a description will be given of the problem in the case where the first oil passage 31 is opened and closed by the leaf valve 40 whose one end portion in the radial direction is the fixed end with reference to FIG. 19 to FIG. 21.

Figure 19:
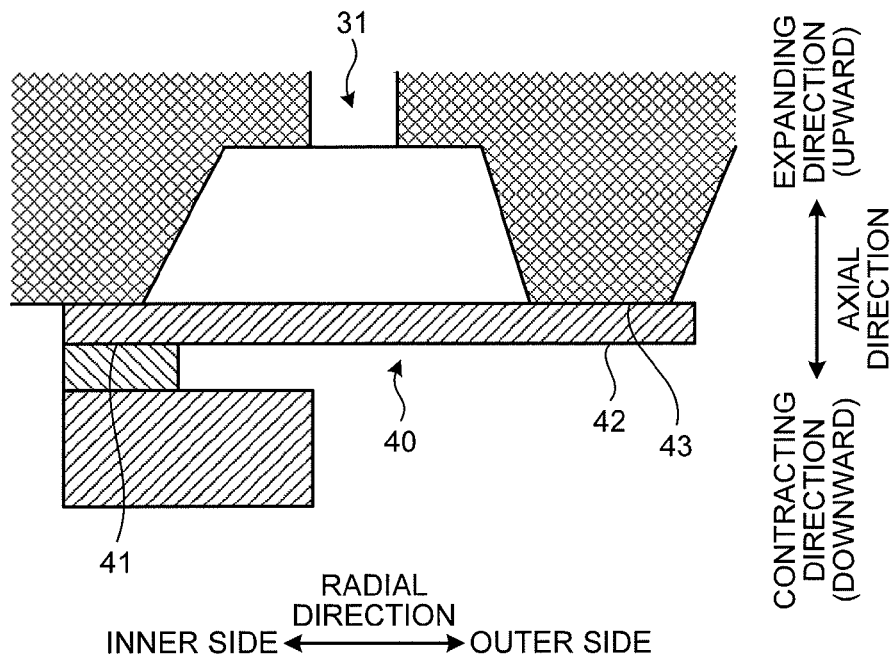
FIG. 19 is a diagram illustrating a closed state of the leaf valve whose inner edge portion is a fixed end.
Figure 20:
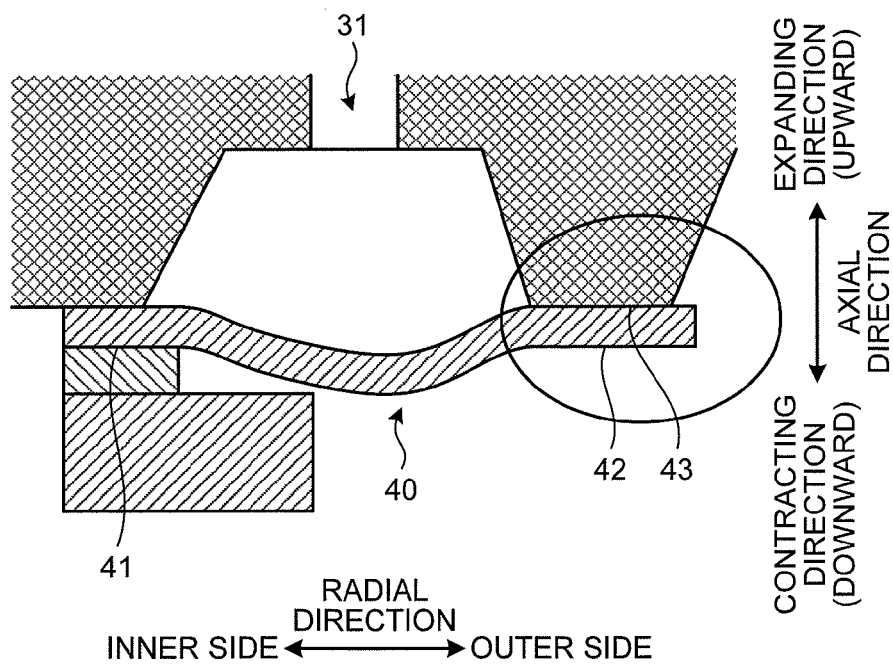
FIG. 20 is a diagram illustrating suction of the leaf valve whose inner edge portion is the fixed end.
Figure 21:
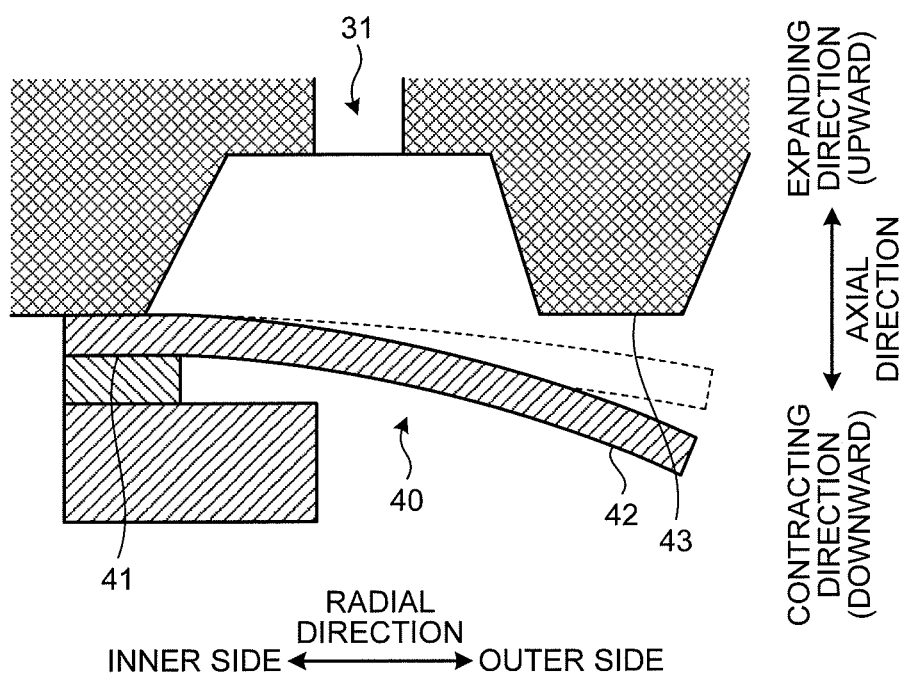
FIG. 21 is a diagram illustrating overshoot at a valve opening of the leaf valve whose inner edge portion is the fixed end opens.

FIG. 19 to FIG. 21 illustrate examples of the leaf valve whose one end in both ends in the radial direction are fixed ends. FIG. 19 is a diagram illustrating a closed state of the leaf valve whose inner edge portion is a fixed end. FIG. 20 is a diagram illustrating suction of the leaf valve whose inner edge portion is the fixed end. FIG. 21 is a diagram illustrating overshoot at a valve opening of the leaf valve whose inner edge portion is the fixed end opens.

As illustrated in FIG. 19, the leaf valve 40 has the inner edge portion 41 as the fixed end. The outer edge portion 42 of the leaf valve 40 is the free end and in surface contact with a valve seat 43. When the leaf valve 40 and the valve seat 43 are in surface contact with each other, the leaf valve 40 is likely to be suctioned to the valve seat 43. When the pressure in the first oil passage 31 is increased in the state where the leaf valve 40 is suctioned to the valve seat 43, the leaf valve 40 deforms as illustrated in FIG. 20 due to the differential pressure.

In the case where opening of the leaf valve 40 at a low piston speed is attempted, the rigidity of the leaf valve 40 might be reduced. However, in the case where the rigidity of the leaf valve 40 is reduced, the deformation amount of the leaf valve 40 is increased when suction occurs. When the leaf valve 40 is maintained to be suctioned to the valve seat 43, the oil pressure in the first oil passage 31 increases more than the original oil pressure when the valve opens. Additionally, the leaf valve 40 deforms. When the suction is released and then the leaf valve 40 rapidly opens as illustrated in FIG. 21, an overshoot of the leaf valve 40 might occur with respect to the valve position (see the dashed line) corresponding to the piston speed and the vibration might cause abnormal noise.

In contrast, the first leaf valve 11 of this embodiment has linear contact with each of the outer protrusion 3*b* and the leaf sheet 5. Accordingly, the suction between the first leaf valve 11 and the outer protrusion 3*b* and the suction between the first leaf valve 11 and the leaf sheet 5 are less likely to occur. Thus, the first leaf valve 11 of this embodiment reduces generation of abnormal noise when the valve opens.

In the shock absorber 100 of this embodiment, the flow passage cross-sectional area of the first oil passage 31 is larger than the flow passage cross-sectional area of the second oil passage 32. In this embodiment, the flow passage cross-sectional area of the first oil passage 31 is larger than both of the flow passage cross-sectional area of the expansion-side oil passage 32*a* and the flow passage cross-sectional area of the contraction-side oil passage 32*b*. This allows reducing the increase in differential pressure between the lower space portion 7*b* and the first oil passage 31 when the piston 1 moves so as to, for example, reduce the gradient of the damping force in the first leaf valve 11 with respect to the piston speed. Here, the respective values of the flow passage cross-sectional areas of the oil passages 31 and 32 may employ the respective cross-sectional areas in the portions where the flow passage cross-sectional areas of the oil passages 31 and 32 are minimum.

As the method for setting the flow passage cross-sectional area of the first oil passage 31 larger than the flow passage cross-sectional area of the second oil passage 32, for example, as illustrated in FIG. 1, there is the method for setting the width in the radial direction of the first oil passage 31 larger than the width in the radial direction of the expansion-side oil passage 32*a* and the width in the radial direction of the contraction-side oil passage 32*b*. Other than this method, the first oil passage 31 and the second oil passage 32 may have different lengths in the circumferential direction. The flow passage cross-sectional area of the first oil passage 31 may be larger than the flow passage cross-sectional area of the second oil passage 32 as the sum of the flow passage cross-sectional area of the expansion-side oil passage 32*a* and the flow passage cross-sectional area of the contraction-side oil passage 32*b*.

Modification of First Embodiment

Figure 11:
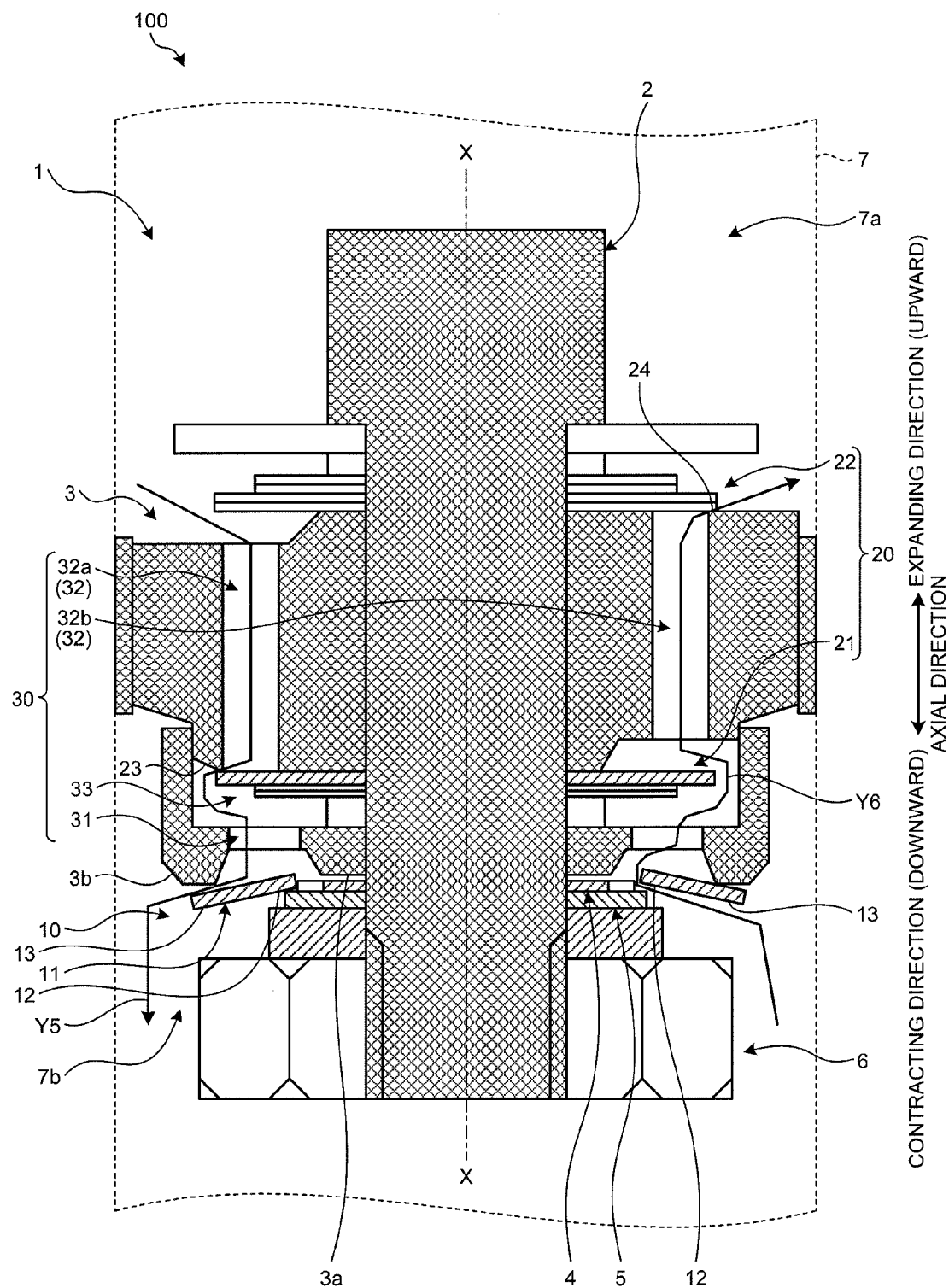
FIG. 11 is a main part cross-sectional view of the shock absorber according to a modification of the first embodiment.

A description will be given of the modification of the first embodiment. FIG. 11 is a main part cross-sectional view of a shock absorber according to a modification of the first embodiment. The configuration of the first valve 10 of this modification is similar to the configuration of the above-described first embodiment.

The shock absorber 100 of this modification differs from the shock absorber 100 of the above-described first embodiment in that the contraction-side second leaf valve 22 always opens the expansion-side oil passage 32*a* and the upper space portion 7*a* and the expansion-side oil passage 32*a* communicate with each other. Additionally, there is also a difference from the above-described first embodiment in that the expansion-side second leaf valve 21 always opens the contraction-side oil passage 32*b* and the intermediate oil passage 33 and the contraction-side oil passage 32*b* communicate with each other.

Similarly to the above-described first embodiment, the first valve 10 controls the damping force in the case where the piston 1 moves in any of the expanding direction and the contracting direction. For example, in the case where the piston 1 moves in the expanding direction, as illustrated by an arrow Y5, the operating fluid flows in the intermediate oil passage 33 from the upper space portion 7*a* through the expansion-side oil passage 32*a* via the cutout portion disposed at the valve seat 23. Furthermore, the operating fluid enters the first oil passage 31 from the intermediate oil passage 33 so as to increase the pressure in the first oil passage 31. In the case where the force caused by the differential pressure is less than the force corresponding to the preset load, the first leaf valve 11 is closed. Additionally, the outer edge portion 13 of the first leaf valve 11 opens when the force caused by the differential pressure becomes equal to or more than the force corresponding to the preset load. When the differential pressure between the pressure in the expansion-side oil passage 32*a* and the pressure in the intermediate oil passage 33 reaches a threshold, the expansion-side second leaf valve 21 opens.

In the case where the piston 1 moves in the contracting direction, the pressure in the lower space portion 7*b* becomes higher than the pressure in the first oil passage 31. The inner edge portion 12 of the first leaf valve 11 opens when the force caused by this differential pressure becomes equal to or more than the force corresponding to the preset load. When the first leaf valve 11 opens, as illustrated by an arrow Y6, the operating fluid enters the first oil passage 31 and flows in the expansion-side oil passage 32a and the contraction-side oil passage 32b from the intermediate oil passage 33. In the case where the piston speed is a low speed, the operating fluid flows out to the upper space portion 7a from the expansion-side oil passage 32a. When the differential pressure between the pressure in the contraction-side oil passage 32b and the pressure in the upper space portion 7a reaches a threshold, the contraction-side second leaf valve 22 opens so as to open the contraction-side oil passage 32b.

Second Embodiment

Figure 12:
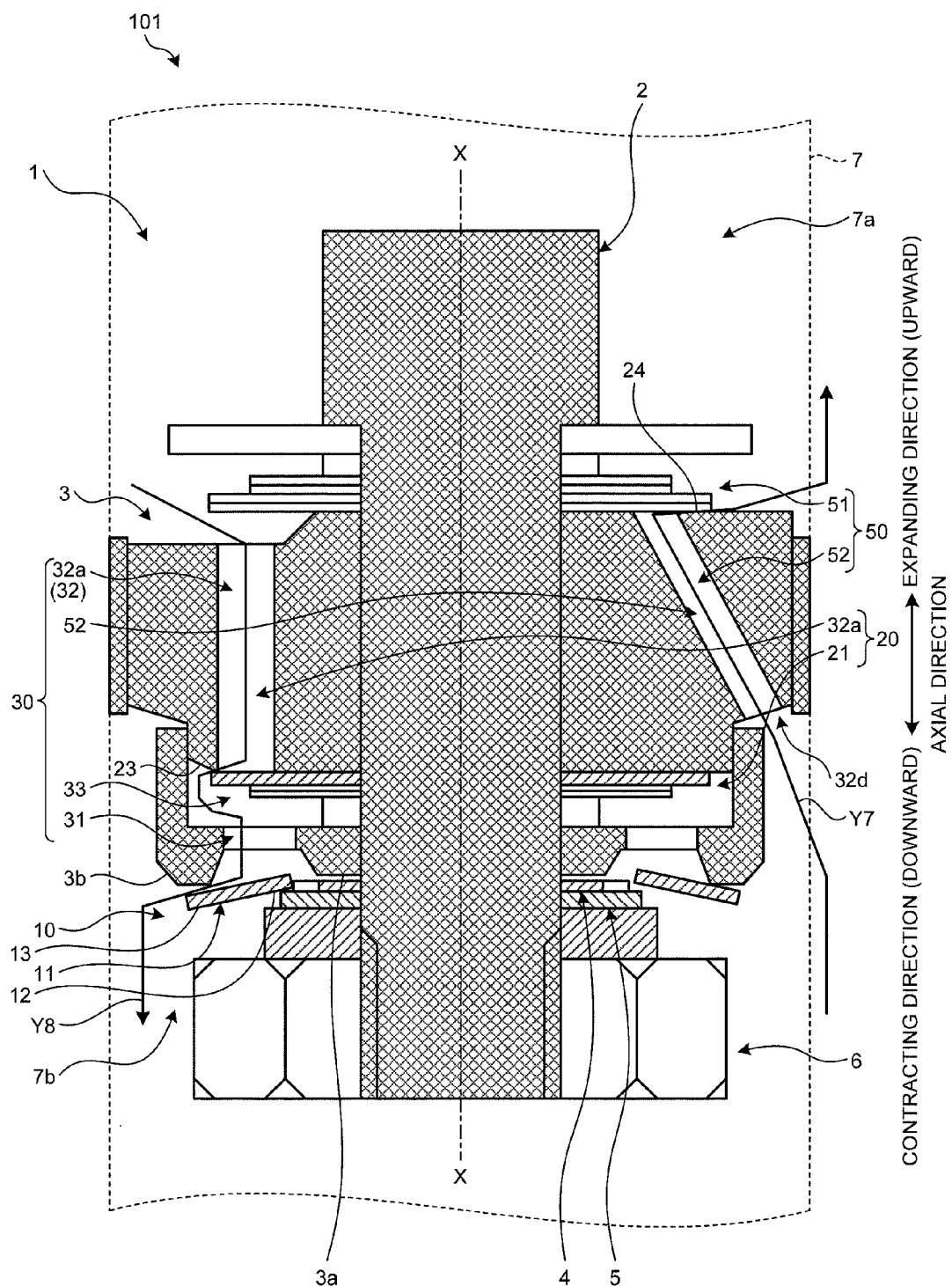
FIG. 12 is a main part cross-sectional view of the shock absorber according to a second embodiment.
Figure 13:
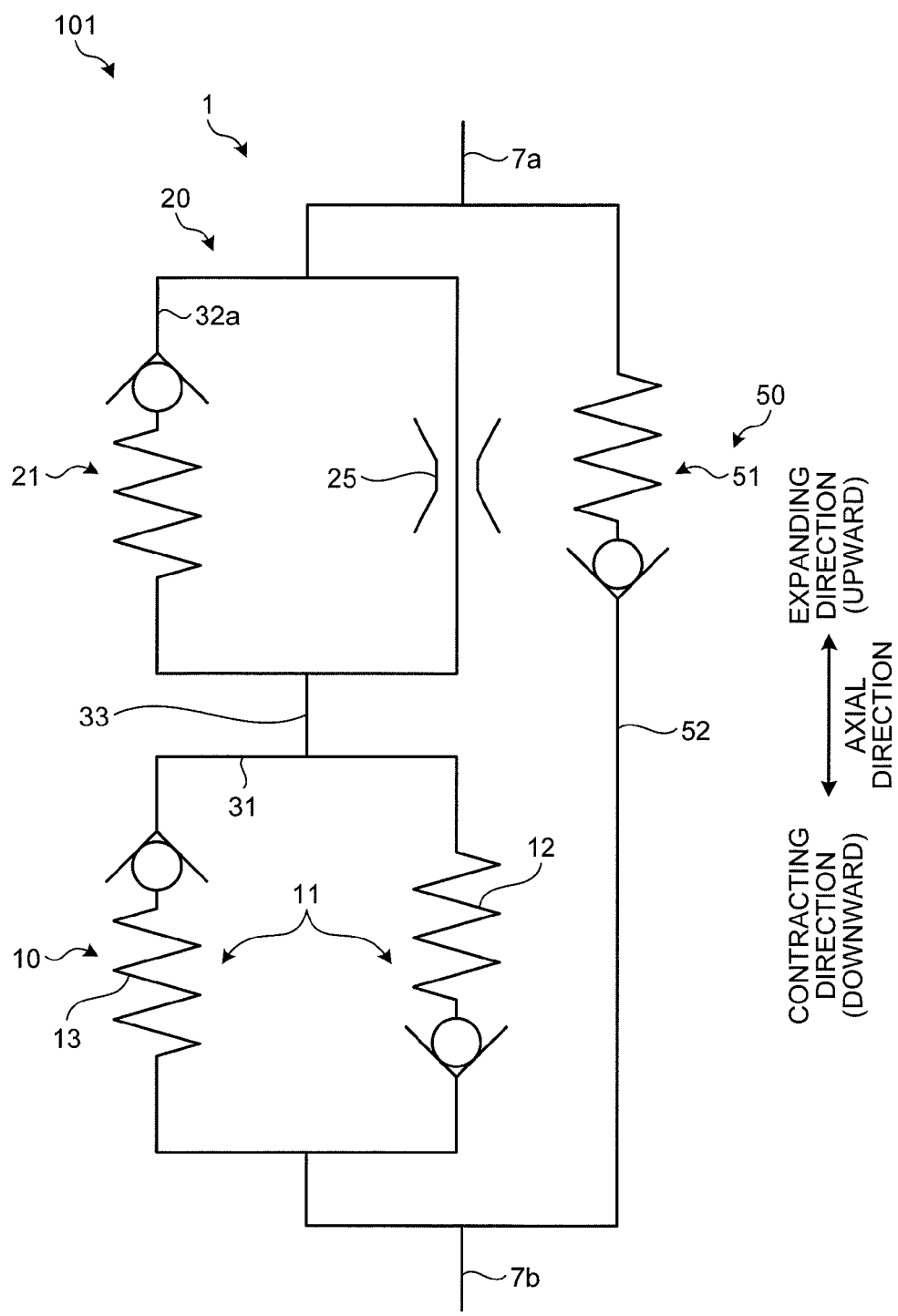
FIG. 13 is a diagram illustrating the function of the shock absorber according to the second embodiment.

A second embodiment will be described with reference to FIG. 12. In the second embodiment, the same reference sign will be given to the component having the same function as the first embodiment, and the repetitive description thereof will be omitted. FIG. 12 is a main part cross-sectional view of a shock absorber according to the second embodiment. FIG. 13 is a diagram illustrating the function of the shock absorber according to the second embodiment. A shock absorber 101 according to the second embodiment differs from the shock absorber 100 of the above-described first embodiment in that the first leaf valve 11 works only on the expansion side. In FIG. 12, the left side on the paper with respect to the center axis line X illustrates the state where the piston 1 moves in the expanding direction, and the right side on the paper with respect to the center axis line X illustrates the state where the piston 1 moves in the contracting direction.

As illustrated in FIG. 12, the piston 1 of this embodiment includes a third valve 50. The third valve 50 includes a contraction-side leaf valve 51 and a contraction-side oil passage 52. The contraction-side leaf valve 51 can be a valve with the configuration similar to that of the contraction-side second leaf valve 22 of the above-described first embodiment. The second valve 20 of this embodiment includes the expansion-side second leaf valve 21 and the expansion-side oil passage 32a. The contraction-side oil passage 52 of the shock absorber 101 is not connected to the intermediate oil passage 33. One end of the contraction-side oil passage 52 is connected to the upper space portion 7a via the contraction-side leaf valve 51. The other end of the contraction-side oil passage 52 is communicated with the lower space portion 7b by an opening portion 32d disposed in the outer peripheral portion of the piston main body 3. Accordingly, the operating fluid of the lower space portion 7b flows directly into the contraction-side oil passage 52 without passing through the first leaf valve 11. That is, in the shock absorber 101 of this embodiment, as illustrated in FIG. 13, the first valve 10 is arranged in series with the expansion-side second leaf valve 21 while being arranged parallel to the contraction-side leaf valve 51.

Accordingly, when the piston 1 moves in the contracting direction, the operating fluid in the lower space portion 7b bypasses the first valve 10 and flows in the contraction-side oil passage 52 as illustrated by an arrow Y7 in FIG. 12. Accordingly, the attenuation characteristic of the shock absorber 101 when the piston 1 moves in the contracting direction is the characteristic illustrated by the dashed line in FIG. 8, that is, the characteristic similar to the attenuation characteristic of the contraction-side leaf valve 51 (the contraction-side second leaf valve 22 of the above-described first embodiment).

On the other hand, when the piston 1 moves in the expanding direction, similarly to the case of the above-described first embodiment, the operating fluid in the upper space portion 7a flows in the first oil passage 31 from the expansion-side oil passage 32a through the intermediate oil passage 33 as illustrated by an arrow Y8. Accordingly, in the case where the first leaf valve 11 is closed, the flow of the operating fluid from the upper space portion 7a to the lower space portion 7b is regulated. Thus, the attenuation characteristic of the shock absorber 101 when the piston 1 moves in the expanding direction is the characteristic illustrated by the solid line in FIG. 8. In other words, the value of the damping force generated by the shock absorber 101 is the value as the sum of the value of the damping force generated by the expansion-side second leaf valve 21 and the value of the damping force generated by the first leaf valve 11.

Modification of Second Embodiment

While in the above-described second embodiment the third valve 50, which bypasses the first valve 10, opens when the piston 1 moves in the contracting direction, the third valve 50 may open when the piston 1 moves in the expanding direction instead. In this case, the third valve 50 is preferred to include, for example, an expansion-side leaf valve similar to the expansion-side second leaf valve 21, an expansion-side oil passage similar to the expansion-side oil passage 32a, and a bypass oil passage. The bypass oil passage bypasses the first valve 10 and communicates the expansion-side oil passage and the lower space portion 7b with each other in the case where the expansion-side leaf valve opens. The second valve 20 is preferred to include the contraction-side oil passage 32b and the contraction-side second leaf valve 22 similar to those of the above-described first embodiment. That is, the second embodiment and this modification disclose the piston 1 that includes the third valve disposed in parallel to the first valve 10.

Third Embodiment

Figure 14:
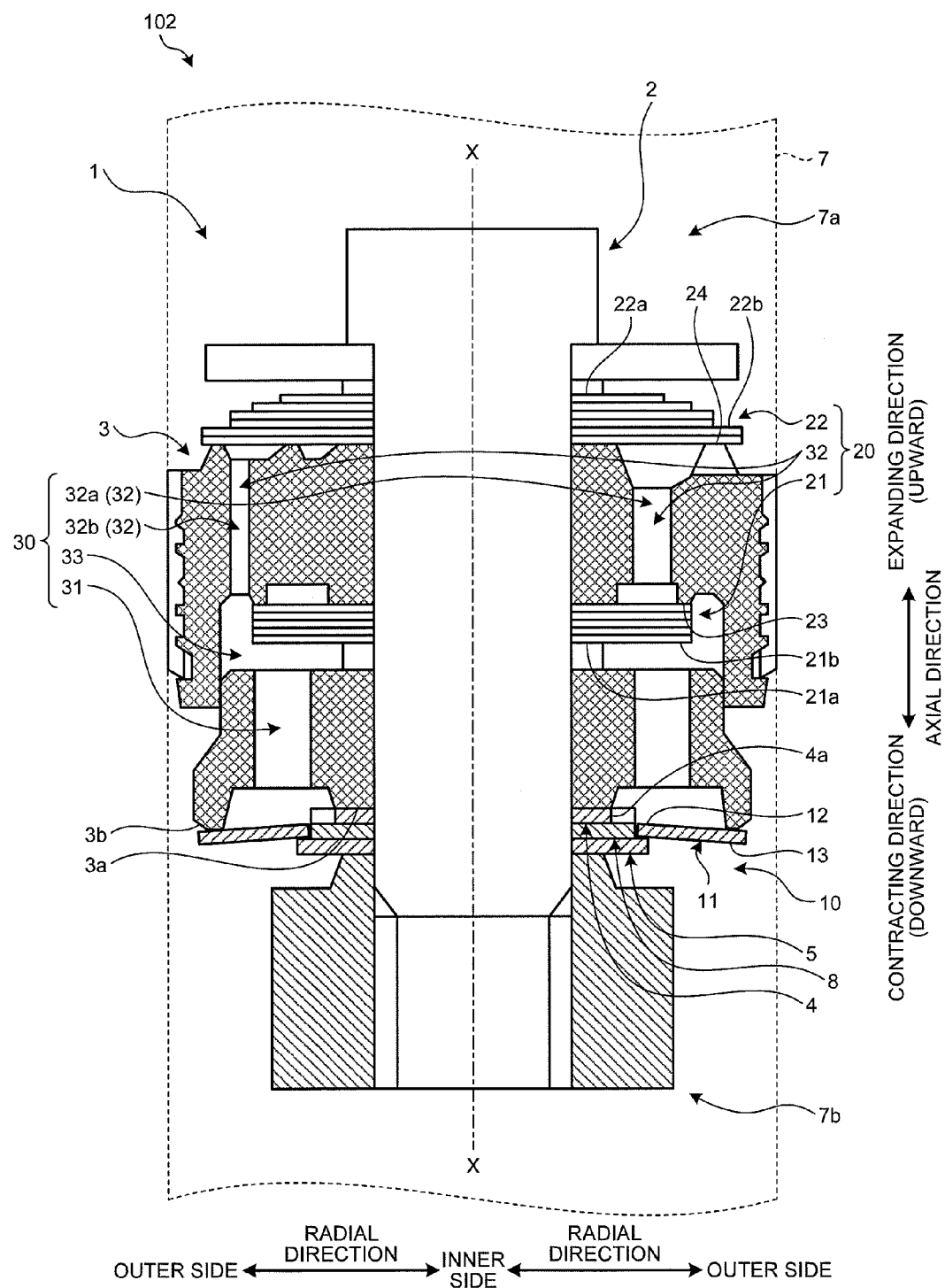
FIG. 14 is a main part cross-sectional view of the shock absorber according to a third embodiment.
Figure 15:
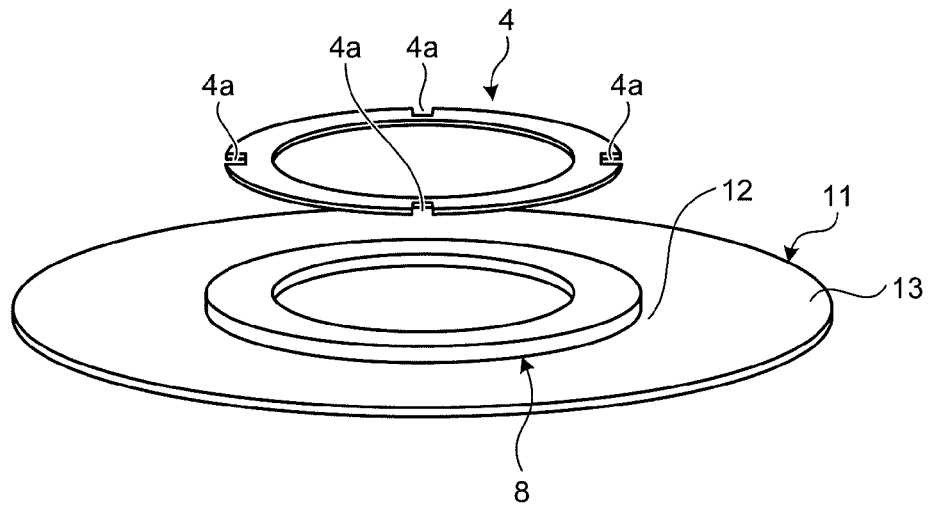
FIG. 15 is a perspective view illustrating the configuration members of the shock absorber according to the third embodiment.
Figure 16:
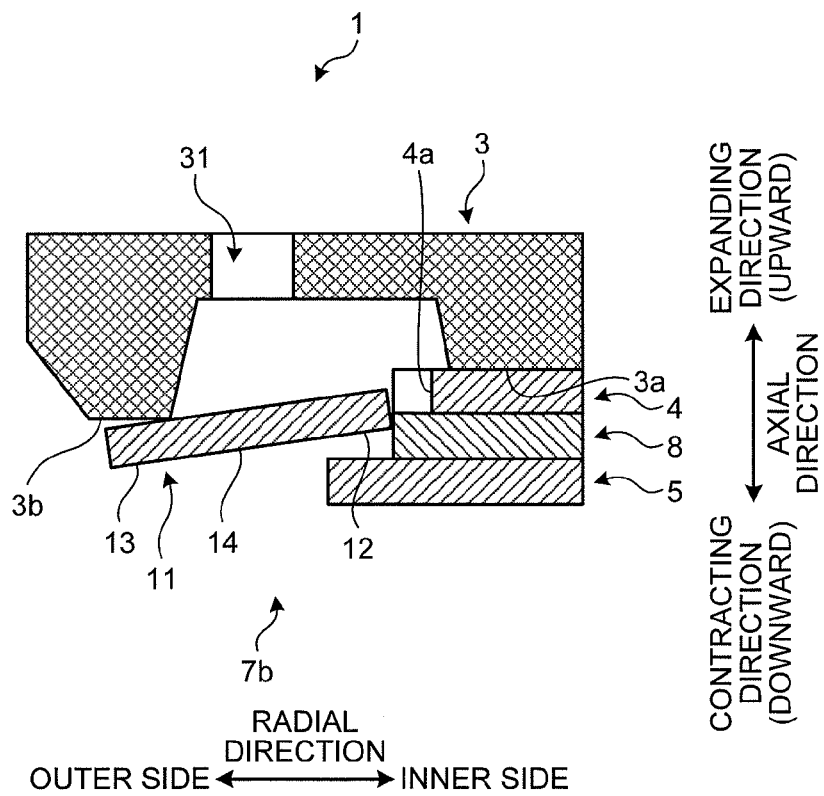
FIG. 16 is a diagram illustrating a substantive valve-closed state of the first leaf valve.
Figure 17:
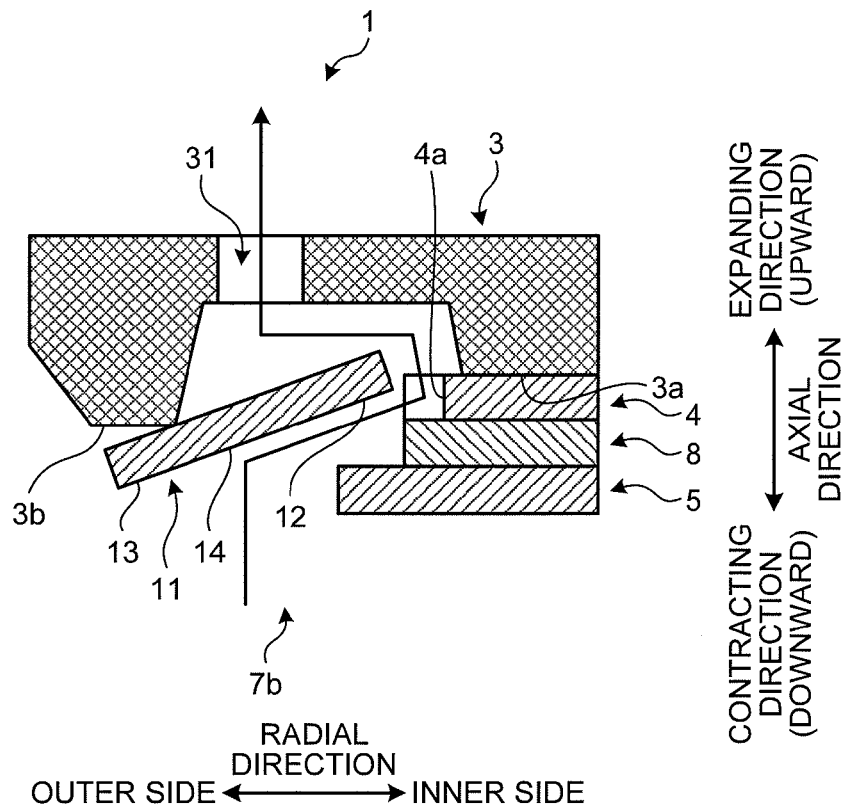
FIG. 17 is a diagram illustrating a valve-opening state of the first leaf valve.

A third embodiment will be described with reference to FIG. 14 to FIG. 17. In the third embodiment, the same reference sign will be given to the component having the same function as the first embodiment and the second embodiment, and the repetitive description thereof will be omitted. FIG. 14 is a main part cross-sectional view of a shock absorber according to the third embodiment. FIG. 15 is a perspective view illustrating the configuration members of the shock absorber according to the third embodiment. FIG. 16 is a diagram illustrating a substantive valve-closed state of the first leaf valve. FIG. 17 is a diagram illustrating a valve-opening state of the first leaf valve. A shock absorber 102 according to the third embodiment differs from the shock absorbers 100 and 101 in the above-described respective embodiments in that the first valve 10 generates different magnitudes of damping forces corresponding to the moving direction of the piston 1 with respect to the same magnitude of the piston speed. Thus, the shock absorber 102 of this embodiment includes an adjustment sheet 8 for adjusting the damping force as one example of the configuration that generates different magnitudes of the damping forces corresponding to the moving direction of the piston 1.

The adjustment sheet 8 is an annularly-shaped and plate-shaped member. The outer diameter of the adjustment sheet 8 of this embodiment is slightly smaller than the inner diameter of the first leaf valve 11. As illustrated in FIG. 14 and FIG. 15, the adjustment sheet 8 is disposed on the radially inner side of the first leaf valve 11 and coaxially with the first leaf valve 11. The clearance between the inner peripheral surface of the first leaf valve 11 and the outer peripheral surface of the adjustment sheet 8 is preferred to be narrow to the extent so as to regulate the flow of the operating fluid. That is, in the case where the inner edge portion 12 of the first leaf valve 11 is lifted by the differential pressure, it is preferred that the operating fluid cannot actually flow through between the first oil passage 31 and the lower space portion 7b unless the inner edge portion 12 is lifted in the expanding direction by the plate thickness of the adjustment sheet 8.

The adjustment sheet 8 functions as a regulating member that regulates the flow of the operating fluid until the valve opening degree of the inner edge portion 12 of the first leaf valve 11, that is, the size of the gap between the leaf sheet 5 and the inner edge portion 12 becomes a predetermined valve opening degree.

In the case where the piston 1 moves in the contracting direction, when the force caused by the differential pressure between the pressure in the lower space portion 7b and the pressure in the first oil passage 31 is equal to or more than the force corresponding to the preset load, the inner edge portion 12 of the first leaf valve 11 separates from the leaf sheet 5. However, when the piston speed is low and the lifted amount of the inner edge portion 12 is small even in the case where the inner edge portion 12 separates from the leaf sheet 5, the outer peripheral surface of the adjustment sheet 8 and the inner peripheral surface of the first leaf valve 11 face each other in the radial direction as illustrated in FIG. 16. As described above, since the gap between the outer peripheral surface of the adjustment sheet 8 and the inner peripheral surface of the first leaf valve 11 is small, the flow of the operating fluid from the lower space portion 7b to the first oil passage 31 is regulated when the lifted amount of the inner edge portion 12 is small. Accordingly, similarly to the case where the inner edge portion 12 is seated on the leaf sheet 5, the first valve 10 regulates the flow of the operating fluid between the lower space portion 7b and the upper space portion 7a, thus being actually in the valve-closed state.

When the piston speed is increased and the lifted amount of the inner edge portion 12 becomes equal to or more than the plate thickness of the adjustment sheet 8 as illustrated in FIG. 17, the gap between the adjustment sheet 8 and the inner edge portion 12 is expanded. This allows the operating fluid to flow from the lower space portion 7b to the first oil passage 31. That is, the first valve 10 of this embodiment actually opens at the piston speed at which the lifted amount of the inner edge portion 12 becomes equal to or more than the plate thickness of the adjustment sheet 8 in the case where the piston 1 moves in the contracting direction.

On the other hand, in the case where the piston 1 moves in the expanding direction, similarly to the first valve 10 of the above-described embodiments, the first valve 10 opens at the piston speed at which the outer edge portion 13 separates from the outer protrusion 3b. Accordingly, assuming that the magnitude of the piston speed when the outer edge portion 13 opens is V2 and the magnitude of the piston speed when the lifted amount of the inner edge portion 12 becomes equal to or more than the plate thickness of the adjustment sheet 8 and the inner edge portion 12 actually opens is V3, following Formula (3) is satisfied.

$$V2 < V3 \tag{3}$$

Accordingly, in the first valve 10 of this embodiment, the damping force when the piston 1 moves in the contracting direction is larger than the damping force when the piston 1 moves in the expanding direction with respect to the same magnitude of the piston speeds. The first valve 10 of this embodiment allows setting an appropriate attenuation characteristic of the shock absorber 102 taking into consideration that, for example, the feeling of the occupant with respect to the damping force and the expected damping force are different between the expanding operation and the contracting operation.

Here, in contrast to the configuration described above, the first valve 10 may be constituted such that the damping force when the piston 1 moves in the expanding direction is larger than the damping force when the piston 1 moves in the contracting direction with respect to the same magnitude of the piston speeds. For example, the adjustment sheet 8 may be disposed on the radially outer side of the first leaf valve 11 instead of on the radially inner side. In this case, the adjustment sheet 8 only needs to have the inner diameter slightly larger than the outer diameter of the first leaf valve 11. The clearance between the outer peripheral surface of the first leaf valve 11 and the inner peripheral surface of the adjustment sheet 8 is preferred be narrow to the extent so as to regulate the flow of the operating fluid. In the case where the piston 1 moves in the expanding direction, unless the outer edge portion 13 is lifted by the plate thickness of the adjustment sheet 8 in the contracting direction, the first valve 10 is actually in the valve-closed state. On the other hand, when the lifted amount of the outer edge portion 13 is equal to or more than the plate thickness of the adjustment sheet 8, the first valve 10 actually opens so as to allow the flow of the operating fluid.

Additionally, instead of arranging the adjustment sheet 8 on the radially outer side of the first leaf valve 11, a wall surface may be disposed on the radially outer side of the first leaf valve 11. For example, a wall surface that surrounds the outer peripheral surface of the first leaf valve 11 may be disposed by making a part of the outer protrusion 3b to project in the contracting direction.

The first valve 10 of this embodiment described above generates different magnitudes of the damping forces with respect to the same magnitude of the piston speeds between the case where the piston 1 moves in the expanding direction and the case where the piston 1 moves in the contracting direction.

First Modification of Each Embodiment

Figure 18:
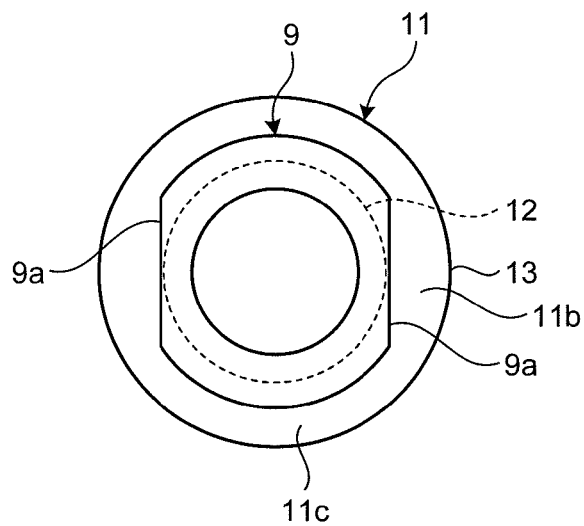
FIG. 18 is a plan view illustrating a leaf sheet according to a first modification of each embodiment.

A first modification of each of the first embodiment to the third embodiment will be described with reference to FIG. 18. FIG. 18 is a plan view illustrating a leaf sheet according to the first modification of each embodiment. A leaf sheet 9 of this modification differs from the leaf sheet 5 of each embodiment described above in that a part of the outer periphery is cut out. The leaf sheet 9 of this modification allows a part of the first leaf valve 11 opening ahead. As illustrated in FIG. 18, the leaf sheet 9 has the shape obtained by cutting an annularly-shaped member along two parallel lines at an equal distance from the center. The cutout portion has a side 9a that overlaps with the inner edge portion 12 of the first leaf valve 11 viewed from the axial direction. That is, in the valve-closed state where the inner edge portion 12 is in contact with (seated on) the leaf sheet 9, the first leaf valve 11 regulates the flow of the operating fluid.

The first leaf valve 11 has different pressure receiving areas between a region 11b adjacent to the side 9a in the cutout portion and another region 11c. With respect to the same center angle, the pressure receiving area of the region 11b adjacent to the side 9a in the cutout portion is larger than the pressure receiving area of the other region 11c. Accordingly, the region 11b adjacent to the side 9a in the cutout portion starts to open at a lower piston speed compared with that of the other region 11c. Thus, the leaf sheet 9 of this modification allows, for example, slowing down the start-up of the damping force at the start of movement of the piston.

Second Modification of Each Embodiment

A second modification of each of the first embodiment to the third embodiment described above will be described. In each embodiment described above, the outer edge portion 13 of the first leaf valve 11 is supported from the expanding direction side in the axial direction while the inner edge portion 12 is supported from the contracting direction side. Instead, the outer edge portion 13 may be supported from the contracting direction side while the inner edge portion 12 is supported from the expanding direction side. In this case, it is possible to employ the configuration where the piston main body 3 functions as the first valve seat portion supporting the inner edge portion 12 while the leaf sheet 5 or 9 functions as the second valve seat portion supporting the outer edge portion 13.

While in each embodiment described above the shape of the first leaf valve 11 is the annular shape, the shape of the first leaf valve 11 is not limited to this. For example, the first leaf valve 11 may be a plate-shaped member with the through-hole 11a, and may have a shape different from the annular shape.

The first leaf valve 11 may be disposed without the through-hole. For example, the first leaf valve 11 may be a valve in a quadrangular shape such as a rectangular shape and a square shape, and may have the inner edge portion supported by the first valve seat portion from one side in the axial direction while having the outer edge portion supported by the second valve seat portion from the other side in the axial direction.

The shape of the first leaf valve 11 can be any shape. The first leaf valve 11 is preferred to be arranged in a state deformed by the preset load and pressed against the first valve seat portion and the second valve seat portion by its own restoring force.

The arrangement of the first valve 10 and the second valve 20 is not limited to those in the examples. For example, in each embodiment described above, the first valve 10 is disposed on the contracting direction side with respect to the second valve 20. Instead, the first valve 10 may be disposed on the expanding direction side with respect to the second valve 20. The first leaf valve 11 may be disposed at the end portion on the expanding direction side of the first oil passage 31 instead of being disposed at the end portion on the contracting direction side of the first oil passage 31.

The arrangement and the shape of the cutout portion 4a disposed in the centering sheet 4 are not limited to those in the examples. The shape and the arrangement of the cutout portion 4a are preferred to be changed as necessary corresponding to the desired attenuation characteristic of the first valve 10.

In each embodiment described above, the preset load is adjusted by the level difference AH between the inner protrusion 3a and the outer protrusion 3b (see FIG. 4). Instead or in addition, the preset load may be adjusted by the plate thickness of the centering sheet 4. Thinning the plate thickness of the centering sheet 4 allows increasing the preset load.

In each embodiment described above, the cylinder 7 is coupled below the spring while the piston 1 is coupled above the spring. In contrast, the piston 1 may be coupled below the spring while the cylinder 7 is coupled above the spring. The shock absorbers 100, 101, and 102 in the respective embodiments may be used in other than a vehicle. The moving direction of the piston 1 is not limited to the up-and-down direction.

The leaf sheet 5 and the fixing member 6 may be integrated together. In this case, the fixing member 6 functions as the valve seat portion supporting the first leaf valve 11.

The matters that are disclosed in the respective embodiments and modifications described above may be combined as necessary.

A shock absorber according to the present invention includes a cylinder, a piston, and a piston rod. The piston includes a first valve and a second valve. The first valve includes: a first leaf valve whose inner edge portion and outer edge portion in a radial direction of the piston are free ends; a first valve seat portion configured to support the inner edge portion of the first leaf valve from one side in an axial direction; a second valve seat portion configured to support the outer edge portion of the first leaf valve from another side in the axial direction; and a first oil passage. The first leaf valve opens and closes the first oil passage. The second valve includes: a second leaf valve one of whose inner edge portion and outer edge portion in a radial direction is a fixed end; and a second oil passage. The second leaf valve opens and closes the second oil passage.

The first valve is configured to open and generate a damping force corresponding to a piston speed of the piston by allowing the first leaf valve to separate from one of the first valve seat portion and the second valve seat portion corresponding to a moving direction of the piston in a state where the first leaf valve is supported by the other of the valve seat portions. The second valve is configured to open and generate a damping force corresponding to the piston speed by allowing the second leaf valve to deflect in a case where the moving direction of the piston is a predetermined direction. The first valve and the second valve are arranged in series. With the shock absorber according to the present invention, the first leaf valve having both edge portions as the free ends and the second leaf valve having one edge portion as the fixed end are arranged in series. This provides an effect that allows generating an appropriate damping force in a wide speed range including a range of extra slow speed.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A shock absorber, comprising:
   a cylinder;
   a piston; and
   a piston rod, wherein the piston includes:
      a first valve that includes: a first leaf valve whose inner edge portion and outer edge portion in a radial direction of the piston are free ends; a first valve seat portion configured to support the inner edge portion of the first leaf valve from one side in an axial direction; a second valve seat portion configured to support the outer edge portion of the first leaf valve from another side in the axial direction; and a first oil passage, the first leaf valve opening and closing the first oil passage; and
      a second valve that includes: a second leaf valve one of whose inner edge portion and outer edge portion in the radial direction is a fixed end; and a second oil passage, the second leaf valve opening and closing the second oil passage,
   wherein
      the first valve is configured to open and generate a damping force corresponding to a piston speed of the piston by allowing the first leaf valve to separate from one of the first valve seat portion and the second valve seat portion corresponding to a moving direction of the piston in a state where the first leaf valve is supported by the other of the valve seat portions, the second valve is configured to open and generate a damping force corresponding to the piston speed by allowing the second leaf valve to deflect in a case where the moving direction of the piston is a predetermined direction, the first valve and the second valve are arranged in series, the second leaf valve includes: an expansion-side second leaf valve configured to open at the time the piston moves in an expanding direction; and a contraction-side second leaf valve configured to open at the time the piston moves in a contracting direction, the second oil passage includes: an expansion-side oil passage that is opened or closed by the expansion-side second leaf valve; and a contraction-side oil passage that is opened or closed by the contraction-side second leaf valve, the expansion-side second leaf valve is arranged in series with the first valve, and the contraction-side second leaf valve is arranged in series with the first valve.

2. The shock absorber according to claim 1, wherein
a damping force generated by the first valve is larger than a damping force generated by the second valve in a speed range of the piston speed lower than a predetermined speed, and
a damping force generated by the second valve is larger than a damping force generated by the first valve in a speed range of the piston speed higher than the predetermined speed.

3. The shock absorber according to claim 2, wherein
the piston includes: a piston main body; and a supporting member configured to support the first leaf valve while pressing the first leaf valve against the piston main body in the axial direction,
the first leaf valve is a plate-shaped member with a through-hole, and
the piston main body is configured to function as one of the first valve seat portion and the second valve seat portion while the supporting member is configured to function as another of the first valve seat portion and the second valve seat portion.

4. The shock absorber according to claim 2, wherein
the first leaf valve has line contact with at least any one of the first valve seat portion and the second valve seat portion.

5. The shock absorber according to claim 2, wherein
a flow passage cross-sectional area of the first oil passage is larger than both of a flow passage cross-sectional area of the expansion-side oil passage and a flow passage cross-sectional area of the contraction-side oil passage, and
the flow passage cross-sectional area of the expansion-side oil passage is larger than the flow passage cross-sectional area of the contraction-side oil passage.

6. The shock absorber according to claim 1, wherein
the piston includes: a piston main body; and a supporting member configured to support the first leaf valve while pressing the first leaf valve against the piston main body in the axial direction,
the first leaf valve is a plate-shaped member with a through-hole, and
the piston main body is configured to function as one of the first valve seat portion and the second valve seat portion while the supporting member is configured to function as another of the first valve seat portion and the second valve seat portion.

7. The shock absorber according to claim 6, wherein
the first leaf valve has line contact with at least any one of the first valve seat portion and the second valve seat portion.

8. The shock absorber according to claim 6, wherein
a flow passage cross-sectional area of the first oil passage is larger than both of a flow passage cross-sectional area of the expansion-side oil passage and a flow passage cross-sectional area of the contraction-side oil passage, and
the flow passage cross-sectional area of the expansion-side oil passage is larger than the flow passage cross-sectional area of the contraction-side oil passage.

9. The shock absorber according to claim 1, wherein
the first leaf valve has line contact with at least any one of the first valve seat portion and the second valve seat portion.

10. The shock absorber according to claim 9, wherein
a flow passage cross-sectional area of the first oil passage is larger than both of a flow passage cross-sectional area of the expansion-side oil passage and a flow passage cross-sectional area of the contraction-side oil passage, and
the flow passage cross-sectional area of the expansion-side oil passage is larger than the flow passage cross-sectional area of the contraction-side oil passage.

11. The shock absorber according to claim 1, wherein
a flow passage cross-sectional area of the first oil passage is larger than both of a flow passage cross-sectional area of the expansion-side oil passage and a flow passage cross-sectional area of the contraction-side oil passage, and
the flow passage cross-sectional area of the expansion-side oil passage is larger than the flow passage cross-sectional area of the contraction-side oil passage.

12. The shock absorber according to claim 1, wherein
the first valve is configured to generate different magnitudes of damping forces corresponding to the moving direction of the piston with respect to the same magnitude of the piston speed.

* * * * *